United States Patent

[11] 3,617,871

[72] Inventors Emil Rogus;
Michael S. Tamkin, both of Chicago, Ill.
[21] Appl. No. 879,012
[22] Filed Nov. 24, 1969
[45] Patented Nov. 2, 1971
[73] Assignee Zenith Radio Corporation
Chicago, Ill.

[54] FINAL TEST ARRANGEMENT FOR COLOR CATHODE-RAY TUBE
16 Claims, 20 Drawing Figs.

[52] U.S. Cl. ........................................................ 324/20
[51] Int. Cl. ................................................... G01r 31/24
[50] Field of Search ........................................... 324/20, 23;
178/6 TT, 7.8, 7.81

[56] References Cited
UNITED STATES PATENTS
3,369,201  2/1968  Fiore et al. ...................... 324/20

*Primary Examiner*—Gerard R. Strecker
*Attorney*—Francis W. Crotty

ABSTRACT: A test cart has an upper compartment into which a shadow mask color tube is loaded, being received in a movable workholder with the tube axis aligned with a horizontal reference axis. The workholder carries the tube into proper operating relation with respect to the usual accessories such as deflection yoke, convergence assembly, blue lateral, purity coil and tube socket. Various electrical systems are housed in the lower compartment of the cart, supplying energizing potentials and electrical signals necessary to test the tube in an environment closely simulating that of a color television receiver. A digital voltmeter is controlled by a function switching deck for convenient measurement of the operating characteristics of the tube under test.

PATENTED NOV 2 1971
3,617,871
SHEET 1 OF 9
FIG. 2
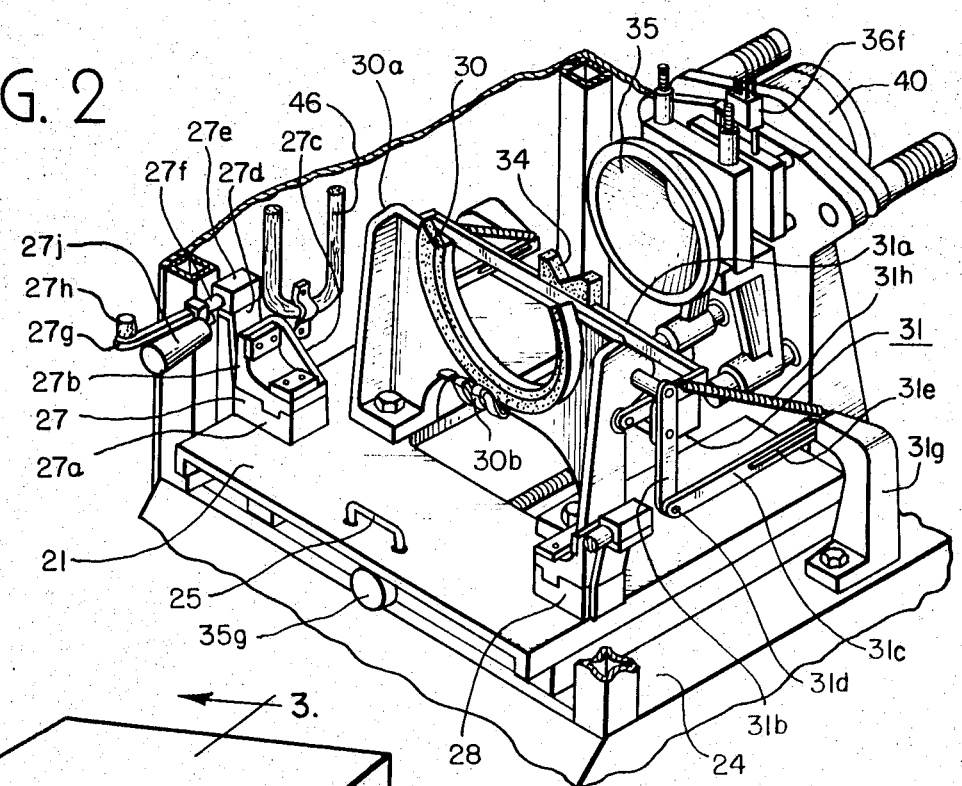
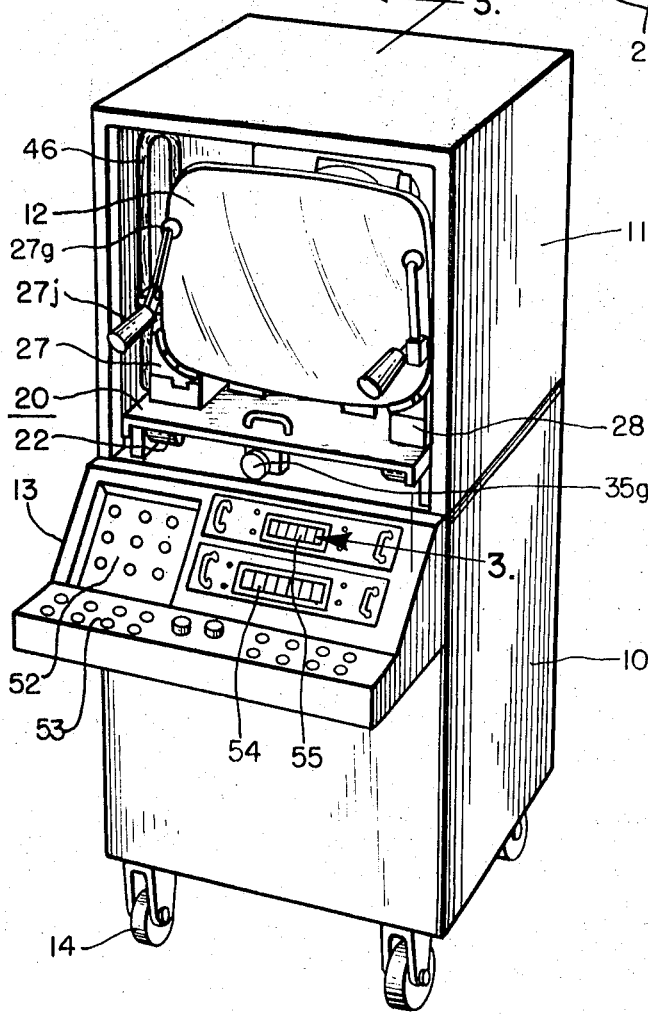
FIG. 1
Inventors
Emil Rogus
Michael S. Tamkin
By Francis W. Crotty
Attorney

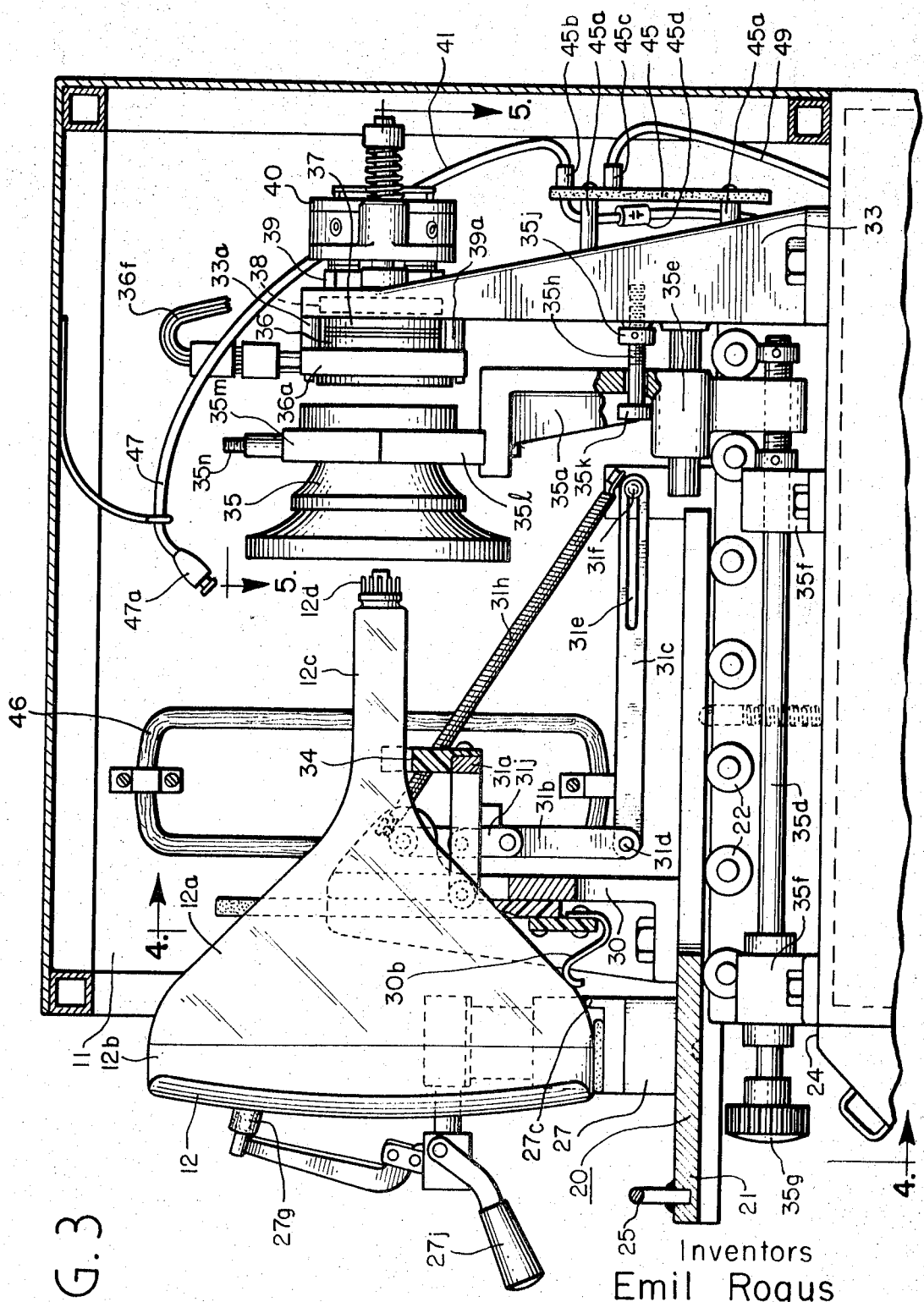

Inventors
Emil Rogus
Michael S. Tamkin
By Francis W. Crotty
Attorney

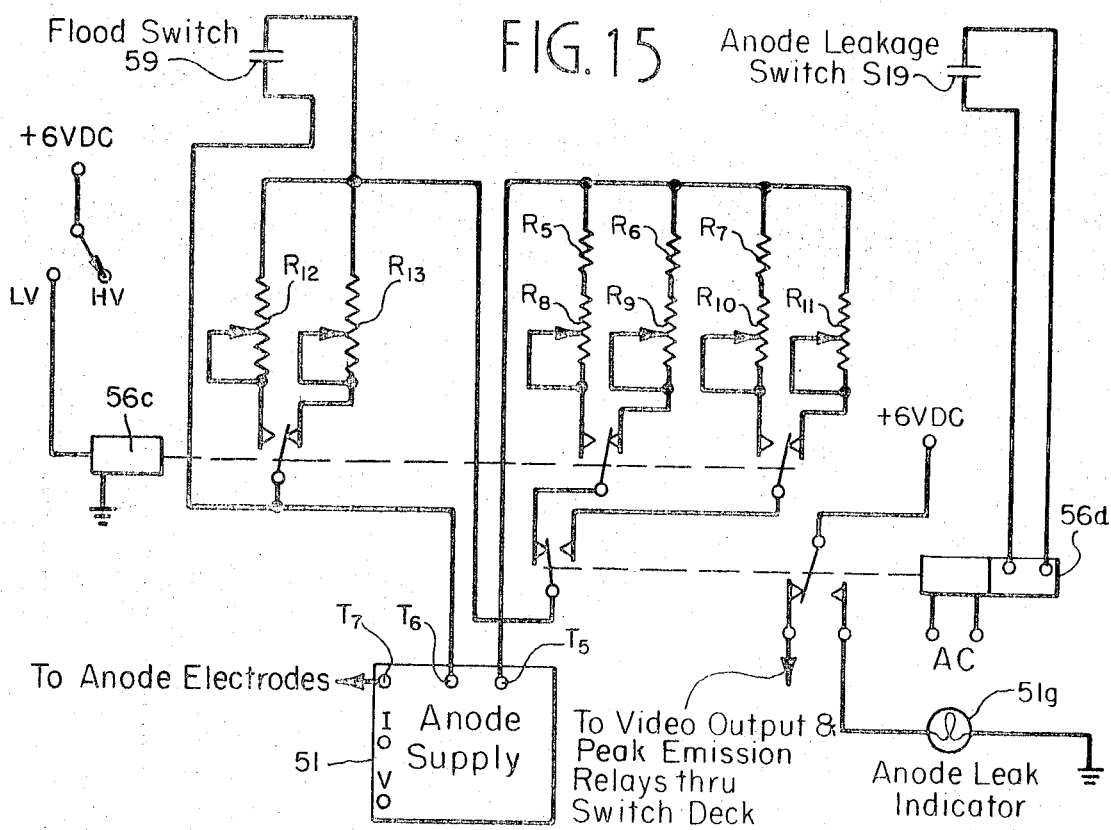
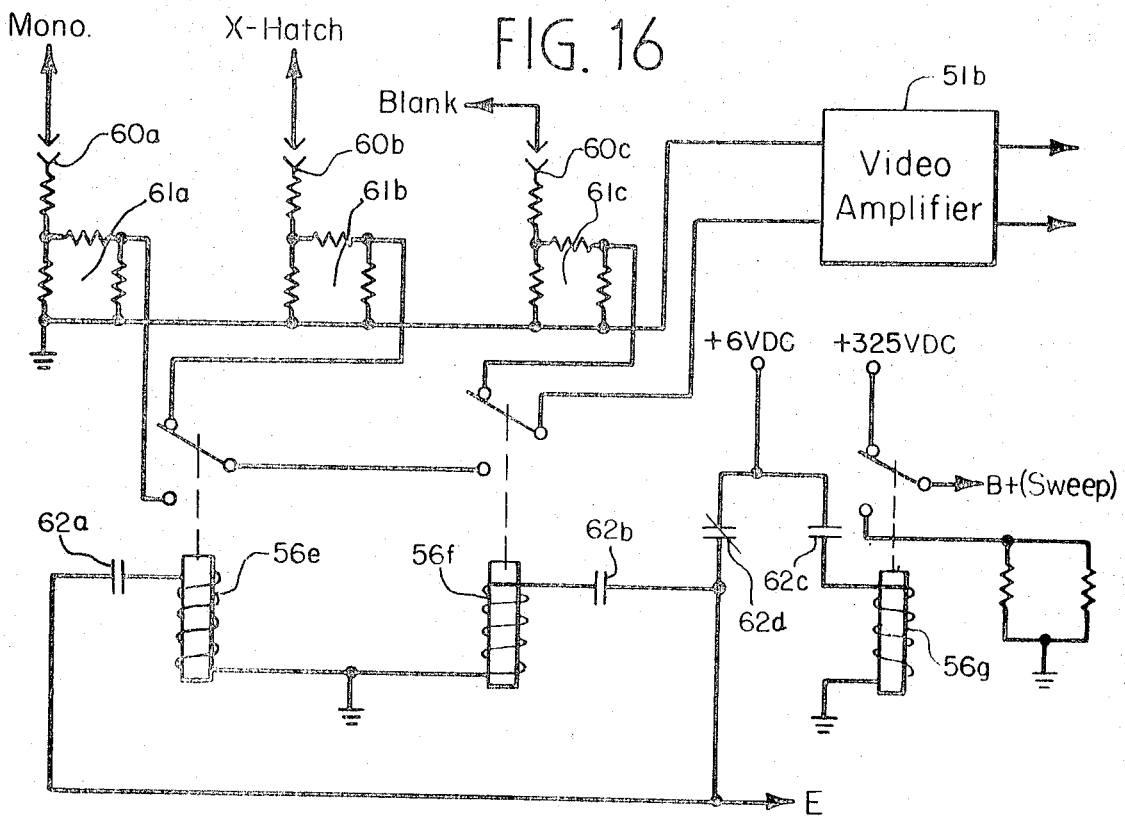

3,617,871

FINAL TEST ARRANGEMENT FOR COLOR CATHODE-RAY TUBE

RELATED APPLICATIONS

A concurrently filed application, Ser. No. 879,013, filed in the name of J. Pecorari et al. claims certain of the electrical features of the test arrangement described herein.

BACKGROUND OF THE INVENTION

The present invention is an improvement over the final test arrangement described and claimed in U.S. Pat. No. 3,369,201, issued on Feb. 18, 1968, in the name of Joseph P. Fiore et al. and assigned to the assignee of the present invention. Testing arrangements of the type under consideration are complicated structures both from the standpoint of their mechanical and electrical systems. This results from the fact that it is necessary to establish the tube in precise orientation relative to the electrical components required to effect its proper operation in order that its operating characteristics may be measured and compared with bogey or tolerance values. Most of these components, such as the deflection yoke, convergence assembly, blue lateral and purity coil enclose various longitudinal sections of the neck of the tube in order to establish the necessary fields to accomplish scanning, convergence, pure color fields and white field and the like all as needed to accomplish image reproduction in simulated natural color. It is not difficult to conceive of a testing arrangement which is to be employed by laboratory technicians who carefully install the color tube with respect to its accessories and conduct the tests which reveal the operating characteristics of the tube. It is a vastly different matter, however, to provide a testing arrangement for use in mass production, to be operated, manipulated and read by line help as distinguished from laboratory personnel.

The above-identified patent is one approach to this problem that has met with success even though it does not attain the simplicity of operation, the ease of tube loading and positioning as well as observation of test results that are attainable with the arrangement which is the subject of the present invention.

Accordingly, it is an object of the invention to provide an improved final test arrangement for color cathode-ray tubes.

It is another object of the invention to provide a color tube final test arrangement which features simplicity of tube loading and testing.

It is still another object of the invention to provide such an arrangement that lends itself equally well to a mass production facility or for laboratory use in tube analysis.

SUMMARY OF THE INVENTION

The arrangement of the invention is for testing a color tube having an electrode system enclosed within an envelope having a funnel-shaped portion that is terminated at its large end in a screen section and is terminated at its small end in both a neck and a base, the latter having terminal prongs for extending circuit connections to the electrode system. The arrangement comprises a workholder, movably between a loading and a test position, having a screen support for receiving the screen section and for releasably holding the tube with its neck disposed horizontally. There is a gauge in the workholder, coaxial with a reference horizontal axis, for engaging the funnel-shaped section in a reference plane disposed transversely of the longitudinal axis of the tube to locate the tube longitudinally within the workholder. The workholder further has a neck support normally positioned coaxially of the reference axis to receive the neck of the tube and align the tube axis with the reference axis. The neck support is movable from its tube supporting position to a second position in which the neck support is moved away from the neck of the tube. A tube socket is supported coaxially of the reference axis and has recesses for receiving the terminal prongs of the base as the workholder is moved into its test position. A deflection yoke is supported coaxially of the reference axis between the workholder and the socket and is movable along the reference axis. Finally, there are means for displacing the neck support to its second position to free the neck for passage through the yoke, as for example when the workholder is moved into the test position.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIG. 1 represents a test cart embodying the invention;

FIG. 2 shows the tube supporting arrangement of the cart;

FIG. 3 is a section view taken along section line 3—3 of FIG. 1;

Figure 4:
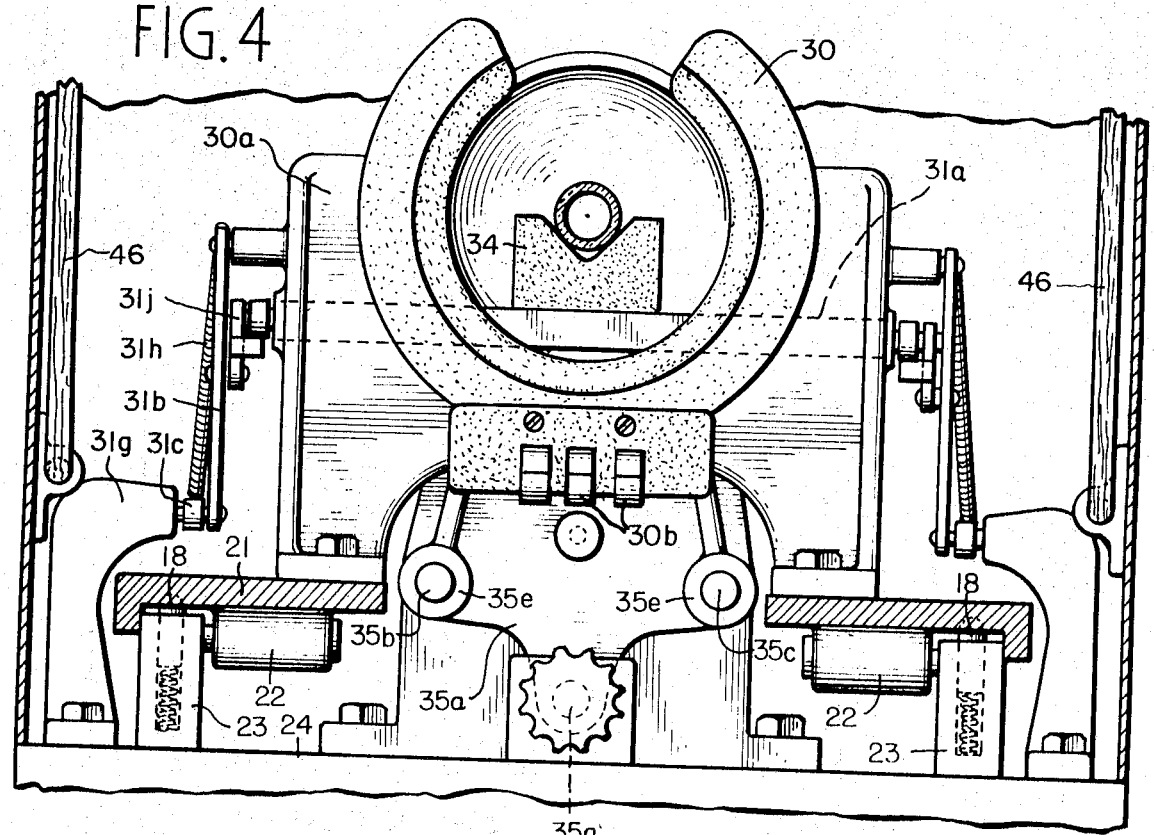
Figure 5:
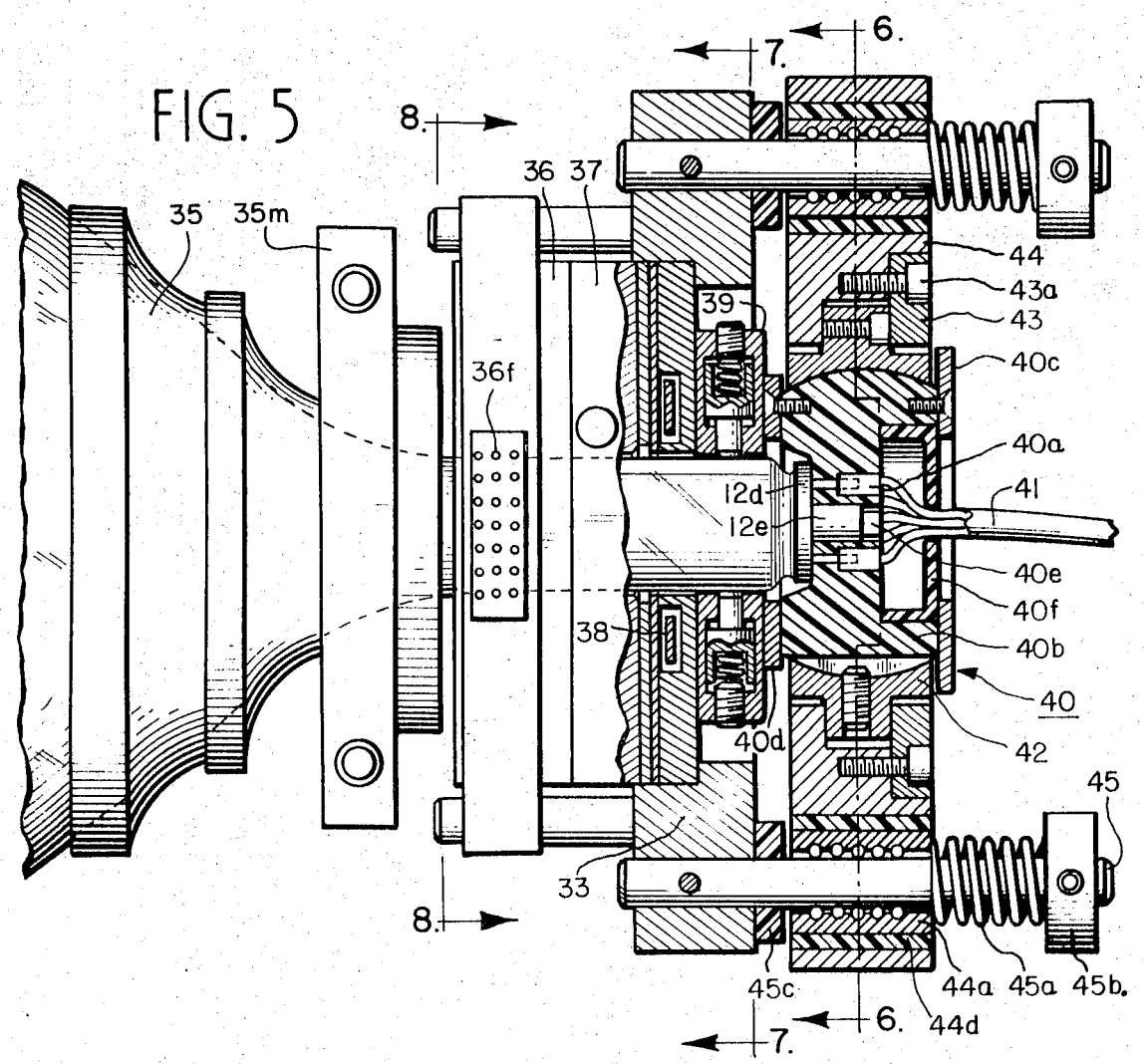
Figure 6:
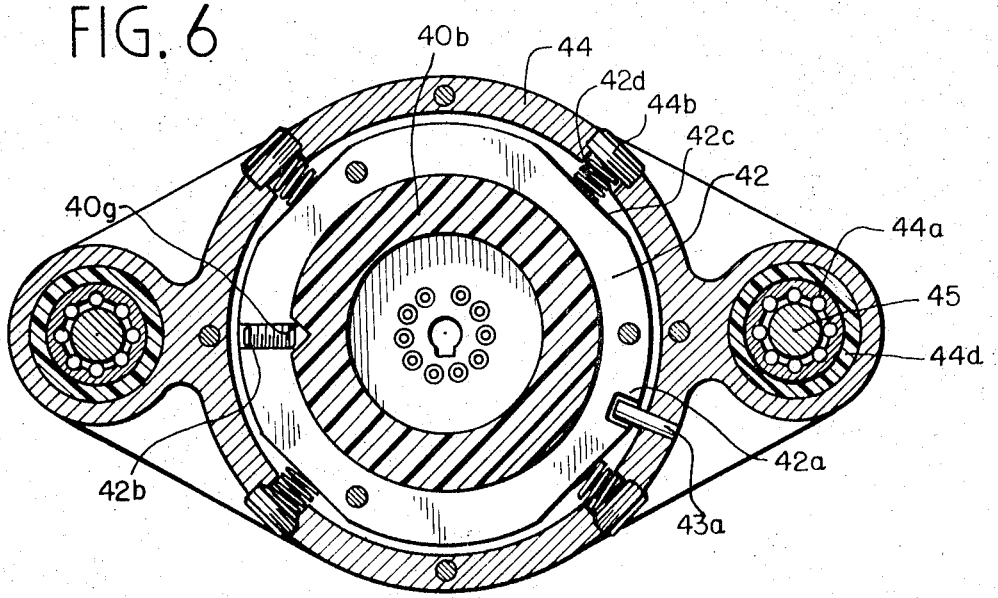
Figure 7:
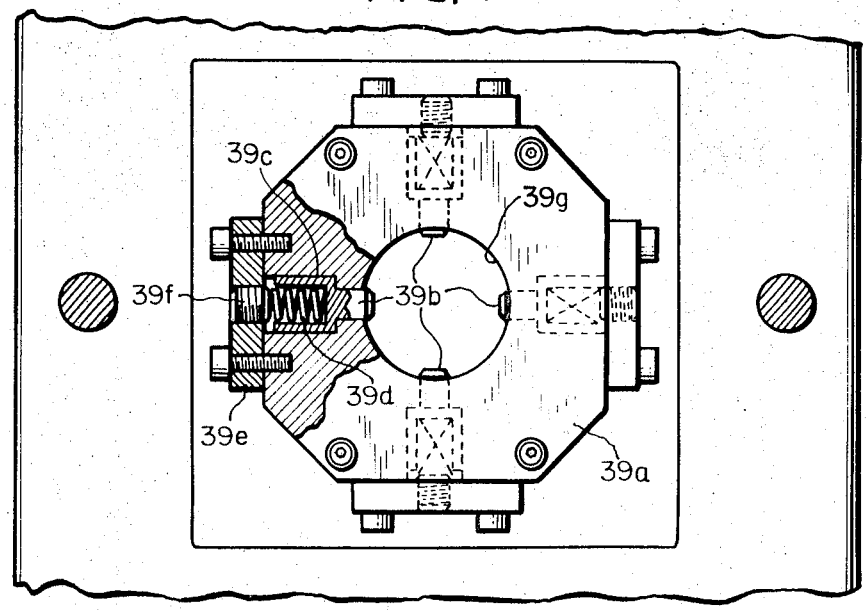
Figure 8:
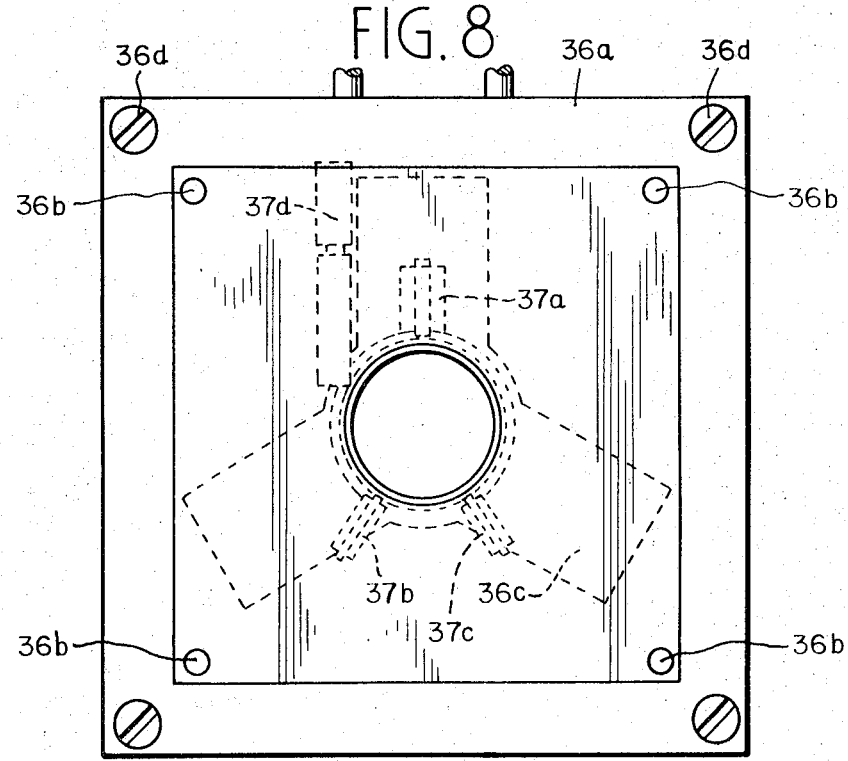

FIGS. 4 and 5 are views taken along section lines 4—4 and 5—5 of FIG. 3;

FIGS. 6, 7 and 8 are views taken along section lines 6—6, 7—7 and 8—8 of FIG. 5;

FIGS. 9-13, inclusive, represent schematically the electrical system and control panels of the test cart; and FIGS. 14-19, inclusive, show certain of the circuitry of the test cart.

The final test arrangement under consideration is flexible, both with respect to the tubes that may be tested and the use to which it may be put in a production facility. More specifically, a 23-inch shadow mask type of three-color cathode-ray tube having a rectangular faceplate section is currently popular and the testing of such a tube will be described with particularity in explaining a preferred form of the invention. The invention is not restricted in use, however, and may be employed with equal facility in measuring similar tubes of different size and different configuration; specifically, tubes having different screen sizes whether the screens be round or rectangular are easily accommodated. Since there is flexibility in exchanging modules of the arrangement, including those that comprise its electrical system, the circuitry may be rearranged as required to test color tubes which are not of the aperture mask variety. For example, the electrical system may be modified by substituting modular-type major components as required to make test measurements of grille tubes in which the screen is formed of phosphors deposited in stripes and in which color selection is under the control of a wire grille. From the standpoint of use, the arrangement is attractive not only because of the simplicity of the measurement procedures involved but also since the arrangement may be used in a laboratory or analyzing position within a plant and, at the same time, lends itself to incorporation with a conveyor which is characteristic of the final test procedure employed at the end of a fabricating system producing color tubes in mass or quantity production.

The representation of FIG. 1 shows the test arrangement to have the general appearance of a cart with a cabinet or body having three principal parts, a lower compartment 10 for housing the major part of the electrical system utilized in final testing of a color picture tube, an upper compartment 11 which may be likened to a television cabinet in the respect that it accepts and supports a tube 12 under test in an environment closely simulating the operating conditions to which such a tube is subjected in normal use, and finally a control deck 13 at the front of the cart which holds in positions for convenient access the many controls, switches and the like to be operated in conducting the various final tests as well as a measuring instrument which records the results of the tests as they are conducted. As explained hereafter, the measuring instrument is of the digital type so that the readings of the instrument, compared with assigned bogeys, make it exceedingly easy to determine an acceptable or reject tube in the course of conducting the test procedures. Moreover, it facilitates adopting set point practices in which an alarm circuit is energized if a test reading exceeds acceptable limits. The cabinet has casters or wheels 14 to the end that the cart may be wheeled easily to a desired test position. Alternatively, the cart may be affixed to a conveyor which, when equipped with a series of such carts, may conveniently transport finished picture tubes from a loading position, through one or several final test positions, to an unloading position which is typical of the procedures of mass production. These latter matters, however, are of no particular concern to the invention and need not be developed further.

The cart, considered as a final test arrangement, divides itself logically into certain areas of subject matter; specifically, the electromechanical portion which has to do with installing a tube under test into position for testing with its electrical accessories in appropriate operating relation, an electrical system for supplying the various signals and potentials necessary to final test, and manual controls by means of which the tube is energized or set up as occurs in its installation in the receiver plus the controls to be actuated in order to conduct a desired series of tests. These subject matters will be considered in the recited order.

ELECTROMECHANICAL

This portion of the test cart is that contained in upper compartment 11 which, for the specific embodiment illustrated, accommodates an aperture or shadow mask color cathode-ray tube 12 having an electrode system (not shown) enclosed within an envelope having a funnel-shaped portion 12a, see FIG. 3, which is terminated at its large end in an image screen section 12b and terminated at its opposite or small end in a neck section 12c and a base 12d. The electrode system is of the multigun type, that is to say, for the additive tricolor system currently in use, has a cluster of three electron guns of the bipotential focus type including four coaxial cylindrical grid electrodes for developing, focusing and accelerating three electron beams which are admitted to the screen section of the tube by passing through the apertures of a shadow mask. The screen is a mosaic or an interlaced pattern of deposits of three different color phosphors, red, green and blue, and each of the electron beams is permitted to impinge solely upon the particular color phosphor to which it has been assigned. This, of course, is the mechanism of color selection and is accomplished by the conjoint effect of the aperture mask, the positioning of the guns within the gun cluster for mechanically accomplishing beam convergence and an auxiliary magnetic convergence system having static as well as dynamic components for maintaining beam convergence throughout the scan raster. All of this is by way of background and is thoroughly understood in the color tube art. It will be assumed that the tube 12 has a 23-inch screen with a normal final anode voltage of about 25 kv.

WORKHOLDER

Figure 3A:
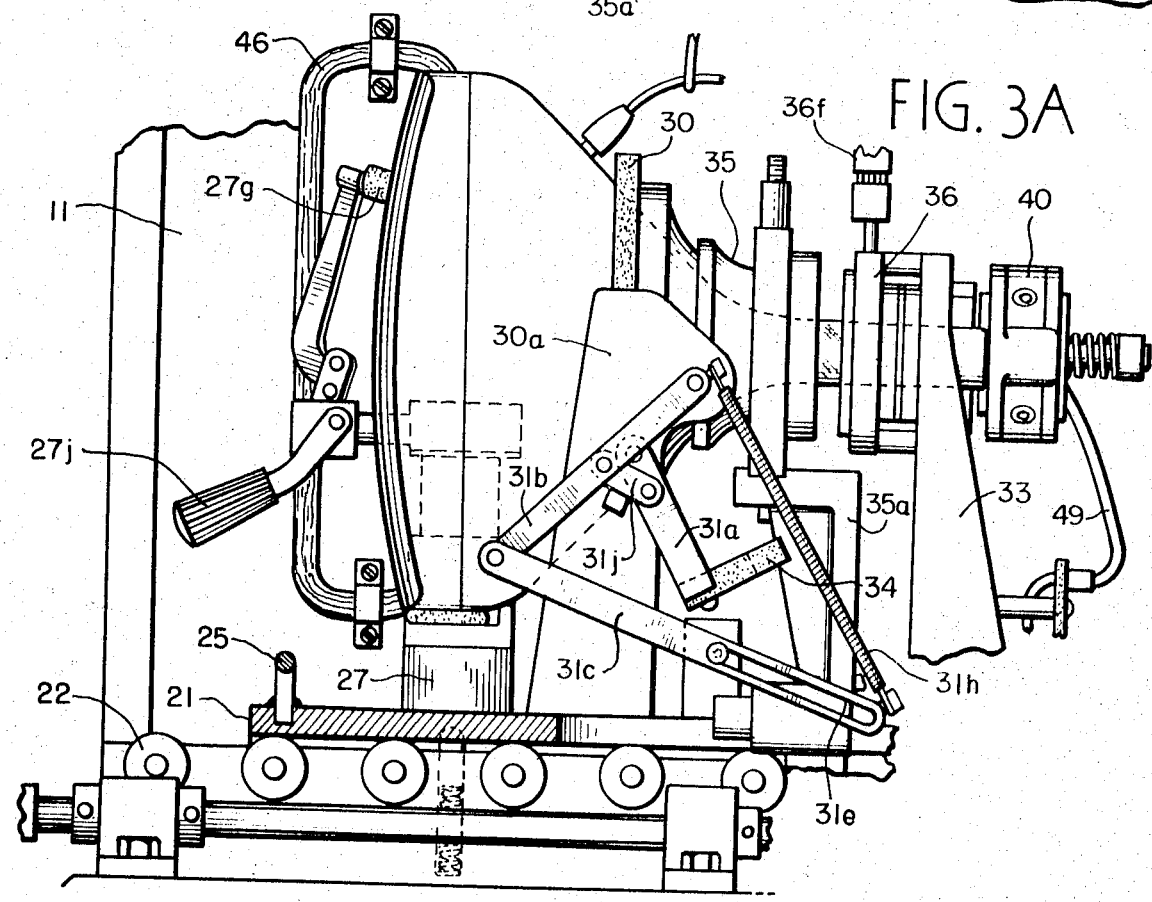
FIG. 3A is similar to FIG. 3 but shows a color tube in testing position.

An important mechanical component of the cart is a workholder 20 movable between loading and test positions represented in FIGS. 3 and 3A, respectively. As indicated in FIGS. 2, 3 and 4, the workholder has a U-shaped platform 21 with its bight at the front of the cart and with arms extending rearwardly over two series of horizontally disposed rollers 22 supported from frame members 23 which are affixed to a bed 24 serving as the floor of compartment 11. A handle 25 facilitates displacement of the workholder between its two operating positions. A screen support for receiving screen section 12b of the tube under test and for releasably holding the tube with its neck section 12c disposed horizontally is affixed to the forward part of platform 21. Essentially, the screen support has a horizontally disposed portion upon which screen section 12b of the tube rests and a vertically disposed portion for engaging funnel section 12a of the tube envelope. Where the tube is rectangular, as assumed for the case under consideration, it is convenient to form the screen support of two components 27 and 28 which are clearly shown in FIG. 2.

Since the components are basically the same, it is sufficient to consider only one, for example, support section 27. It has a mounting block 27a affixed to platform 21 and releasably retaining a formed block or support pad 27b of plastic or other material chosen to avoid scratching the tube envelope. The face or horizontally extending tube supporting surface of block 27b is of arcuate or essentially L-shaped configuration and has a sufficient depth or dimension in a horizontal plane comfortably to accept and support a corner of screen section 12b of the tube. This arcuate section is backed by a vertical member 27c for engaging funnel section 12a of the envelope as shown in FIG. 3.

Also associated with mounting block 27a to the outside of pad 27b is a vertical member 27d which terminates in a horizontal portion or flange to which is secured a bushing block 27e for receiving a shaft 27f. The free end of shaft 27f supports an overcenter clamp 27g having a pad 27h of soft material, such as rubber, for contacting the periphery of a contained tube, above its horizontal axis, when clamp 27f is closed as represented in FIG. 1. The linkage of the clamp includes a handle 27j having one position, see FIG. 2, in which pad 27h is lifted back away from the position of the screen of a tube in the workholder and having a second position, see FIG. 1, in which the clamp firmly engages the screen of a tube in the workholder to clamp it in place. Obviously, the first is a loading position while the second is the test position. Preferably, shaft 27f is adjustably secured in block 27e, by an adjustable setscrew or the like (not shown), to position the clamp in a longitudinal direction appropriately with respect to a tube to be supported by screen supports 27, 28. Bistable overcenter clamps of this type are well known.

Further support and longitudinal positioning of a tube to be tested is afforded by a gauge 30 mounted on platform 21 immediately behind screen support 27, 28 in coaxial alignment with a reference horizontal axis with which the longitudinal axis of the tube is to be coextensive when the tube is properly positioned in the workholder. The gauge is dimensioned to engage funnel section 12a of the tube envelope in a reference transverse plane, disposed transversely of the longitudinal axis of the tube, and, in conjunction with screen support 27, 28 and with a neck support presently to be described, to locate the tube both longitudinally within the workholder and along the proper horizontal axis. As shown in FIG. 2, gauge 30 is a sector of a ring or circle and its inner diameter has such dimension as to locate the tube under test properly in a longitudinal direction when that tube is positioned in screen support 27, 28 and advanced in the direction of the gauge until the gauge contacts funnel section 12a and arrests further movement of the tube in that direction. Since the gauge has an open section, being less than a 360° circle, the envelope of the tube is easily admitted into the confines of the gauge. The gauge, in locating the tube properly in a longitudinal direction within workholder 20, serves the necessary purpose of establishing a reference position for a deflection yoke relative to the center or plane of deflection of the tube. The deflection plane of the tube is an identifiable transverse plane passing through funnel section 12a in the flare that leads to section 12c and, of course, it is not possible to have the gauge occupy that plane if the yoke is to be positioned to enclose the center of deflection. It is found from experience that the contour of the envelope in the immediate vicinity of the center of deflection is well controlled and a gauge of accurate internal diameter can be successfully used to establish a transverse reference plane which is a fixed distance forwardly of the center of deflection in the direction of screen section 12b and to which the large end of a deflection yoke may be brought in matching the yoke to the plane or center of deflection of the tube under test. For the 23-inch, 90° tube under consideration the diameter of the gauge is approximately 5¼ inch. The gauge is formed of epoxy glass and is supported in a vertically extending bracket 30a projecting upwardly from platform 21 and having resilient conductive springs 30b which serve to contact and ground the envelope of the tube under test. Grounding springs 30b may be grounded to the cart but, preferably a conductor (not shown) leads to a prepared grounding point, such as the negative terminal of the final anode voltage supply provided in the bottom portion of the cart.

As mentioned above, a neck support 34 is normally positioned coaxially with the reference horizontal axis of the cart to receive neck section 12c of the tube under test further to assure alignment of the tube axis with the reference horizontal axis and the neck support is movable to a second position in which it is displaced away from the neck section of a tube that has been clamped in position within workholder 20. Neck support 34 is generally V-shaped or otherwise presents an open channel into which a tube may be admitted as it is received by work supports 27, 28 and gauge 30. Neck support 34 is formed of acetal resin, such as DuPont's Delrin and is carried centrally of a U-shaped member 31a constituting part of a linkage means 31 for displacing neck support 34 between its normal or loading position and a second or test position in response to movement of workholder 20 between its loading and test positions. At its opposite extreme ends, member 31a is pivotally supported from bracket 30a and is moved about its pivots by a toggle mechanism comprised of a pair of links 31b and 31c which are pivotally secured to one another by a pin 31d, see FIG. 2. At its other end link 31b is pivotally affixed to a side flange of member 30a while the opposite end of link 31c has a slot 31e through which a pin 31f extends as shown in FIG. 3. This pin projects from a stationary member 31g and has a flattened head so that link 31e is trapped so as not to slide off the pin. Slot 31e affords lost motion in the linkage system which permits certain necessary movement of workholder 20 while neck support 34 remains stationary in its second position. A spring 31h biases the ends of links 31b and 31c which open and close in response to movement of workholder 20. The opening and closing of this linkage is translated to member 32a, as required to displace neck support 34, by means of still another link 31j which is shown most clearly in FIG. 3. This link is pivotally connected at one end to link 31b and at its opposite end to member 31a.

TUBE LOADING

When workholder 20 is in its loading position represented in FIG. 3, platform 21 extends beyond the confines of cart compartment 11. Link 31c is disposed horizontally and link 31b is disposed vertically and in this condition link 31j positions member 31a in a horizontal plane to establish neck support 34 in coaxial alignment with gauge 30 and coaxially of the horizontal reference axis of the cart.

With the tube properly loaded as indicated in FIG. 3, workholder 20 is pushed into the cart and in its initial movement link 31c, under the influence of spring 31h, tends to pivot about pin 31f while link 31b likewise tends to pivot about its support, causing pin 31d to be displaced in a clockwise direction and tending to close the toggle comprised of links 31b, 31c. Initially, there is insufficient displacement of link 31j to translate the movement of pin 31d into any appreciable clockwise displacement of link 31j about its pivot and thus some desired lost motion is introduced, desirable because it retains neck support 34 in engagement with tube neck section 12c during the initial inward movement of workholder 20. As the workholder continues to move inwardly of the cart, these actions continue and the toggle closes further until link 31j, in travelling with link 31b, is displaced sufficiently to cause member 31a to rotate in a clockwise direction, withdrawing neck support 34 from its loading position and shifting it out of contact with neck section 12c of the tube that it had previously supported.

Eventually, as workholder 20 moves further into the cart, member 31a abuts against vertical support 30 and at this time neck support 34 shall have been displaced to its second or test position and further movement of support 34 in a clockwise direction is, of course, prevented. However, workholder 20 will not have been moved completely within the cart and it may travel further, with the freedom of motion made possible by slot 31e of link 31c. The final position is that of FIG. 3A which shows how slot 31e has permitted workholder 20 to move deep into compartment 11 with neck support 34 beneath a deflection yoke 35 to be considered more particularly hereafter.

As workholder 20 is moved from the position of FIG. 3A to that of FIG. 3, the converse action takes place. The lost motion of slot 31e is first taken up after which continued outward movement of the workholder causes pin 31d to be rotated counterclockwise and along with it, pin 31j and member 31a, restoring neck support 34 to its tube supporting position of FIG. 3.

ELECTRICAL ACCESSORIES OF WORKHOLDER

The displacement of workholder 20 from its loading to its test position associates the tube under test with accessory electrical components constituting energizing means for establishing operating conditions for the tube under test which simulate its operating conditions in a color television receiver and for also presenting a multiplicity of test points for measuring the operating characteristics of the tube. This energizing means includes a deflection yoke 35, a convergence assembly 36, a blue lateral magnet arrangement 37, a purity coil 38 and a socket 40 all of which are in coaxial alignment along the horizontal reference axis of the cart as represented in FIG. 3. The screen support 27, 28, gauge 30 and neck support 34 by assuring precision of alignment of the tube axis along the reference horizontal axis of the cart make it possible to thread the neck of the tube through these various components simply by displacing workholder 20 to its test position. It is apparent from FIG. 3 that it is necessary to displace neck support 34 from its tube supporting position in order that yoke 35 may be brought in proper circumscribing relation to funnel section 12a of the tube.

The yoke is supported from a movable member 35a which, as shown in FIG. 4, is arranged to establish the yoke location on the premise of an equilateral pyramid design which has the advantage of negligible slope and backlash. More specifically, member 35a is slidably supported on three horizontally disposed posts 35b, 35c and 35d. Preferably, bushings 35e through which post 35b and 35c extend are provided with linear ball bearings and have an inner lining of Neoprene or other compliant material. The posts 35b, 35c, 35d define an equilateral triangle affording highly desirable stability to the yoke support structure. The third post 35d is threaded as indicated in FIG. 3, and is received by a similarly threaded aperture in support member 35a so that rotation of the post is translated into longitudinal displacement of yoke 35. Posts 35b, 35c have only such lengths as required to accommodate a desired maximum longitudinal displacement desired of yoke 35. Post 35d extends forwardly of the test cart, beneath the plane of travel of workholder 20, being rotatably supported in stationary bushings 35f secured to bed 24 of cart compartment 11. At its free end, post 35d is provided with a crank or handwheel 35g to permit rotational displacement of post 35d and longitudinal displacement in a forward or backward direction of yoke 35 relative to workholder 20. Limits are imposed on the travel of the yoke by an arrangement shown in FIG. 3 comprising a threaded member 35h upon which is threaded a first stop 35j and has an enlargement or head 35k serving as a second stop. Stop 35j limits movement of yoke 35 in the direction of socket 40 so that the wires of the yoke assembly are not crushed against convergence assembly 36. Limit 35h on the other hand restricts movement of yoke 35 in the opposite direction so that, with the tube in the test position of FIG. 3A, the yoke assembly is properly located relative to the center of deflection of the tube as determined by an essentially abutting relation of the leading edge of yoke 35 with gauge 30.

The yoke per se is entirely conventional and it is supported from member 35a by a two-part support 35l and 35m which clamp around the outer periphery of the yoke and are coupled to one another by screw arrangements 35n in conventional fashion. The wires of the yoke itself, as well as its lead-in conductors that apply sweep signals thereto, have been omitted simply to avoid unnecessary complication of the drawings.

Convergence assembly 36, blue lateral magnet arrangement 37 and purity coil 38 constitute a subassembly that is removably secured to a vertical standard 33 secured to bed 24 of cart compartment 11. This standard extends across the width of cart compartment 11 and may have supporting web-type flanges facing the back of the cart to the end that, in cross section, it is essentially U-shaped. At its upper end the standard has extensions 33a through which mounting screws (not shown) extend through a frame 36a of the subassembly, removably securing that assembly to support 33. Since the structures of the convergence, blue lateral and purity coil components are well known in the art, they have not been shown in detail although FIG. 8 does indicate certain of these components in outline for a better understanding of the subassembly that they constitute. The broken-construction line 36e indicates the convergence arrangement to have three segments with an angular displacement of 120° relative to one another. Each segment is an electromagnet having a U-shaped core and usually having both horizontal and vertical windings, that is to say, windings to which signals of appropriate waveform and occuring at the horizontal and vertical deflection frequencies are applied in order to establish dynamic fields for maintaining the three electron beams of the tube converged at all points of the scanning raster. A representative convergence arrangement is disclosed in U.S. Pat. No. 2,880,364, issued Mar. 31, 1959. Most often, a component of static convergence is also required and this may be supplied by a permanent magnet associated with each of the U-shaped structures or, and this is the preferred practice for test equipment, circuitry may be provided by means of which direct current components may be introduced into either or both of the windings of the three convergence magnets for accomplishing static convergence at the center of the raster. The practice of static convergency by DC currents is followed in the arrangement under consideration.

The blue lateral magnet comprises a principal electromagnet 37a and a pair of compensating electromagnets 37b and 37c. These electromagnets are arranged on any suitable support structure about a center which is coaxial with convergence assembly 36 and with a radial spacing equal to that of the convergence magnet structures. Generally, only blue magnet 37a is utilized in color receivers but it has been found that some fringe fields may result from the blue lateral magnet and they may be compensated by annulling fields established through compensating magnets 37b and 37c. A circuit (not shown) controls the strength of the compensating magnetic field relative to blue lateral magnet 37a and adjustment of the compensating field is by means of a potentiometer which is shown in broken-construction line 37d. Immediately behind the blue lateral arrangement is the purity coil 38 which is simply a rectangular coil form about which is distributed the desired number of coil turns. The mounting structures of each of the three components 36, 37 and 38 are provided with holes through which nonmagnetic machine screws 36b extend to integrate these components into a single subassembly enclosed within a frame 36c through which mounting screws 36d extend in order to affix the subassembly to extensions 33a of standard 33. Obviously, it is necessary to make circuit connections to electrical components 36-38 and this is easily achieved by having lead-in conductors from the various components brought out to a connector 36f extending from the convergence circuitry contained in the base of the test cart.

It will be observed in FIG. 8 that blue lateral magnet 37a is disposed vertically upward, that is to say, above the reference horizontal axis of the test cart. This is appropriate where the blue gun of the tube under test is likewise vertically upward. In certain tube structures the blue gun is beneath the tube axis and such a tube may be tested in the arrangement under consideration by removing the subassembly of the convergence, blue lateral and purity coil and simply inverting it so that blue lateral 37a is changed to be beneath the horizontal reference axis of the cart.

AUXILIARY NECK LOCATER

It is most desirable, and certainly necessary for optimum tube testing, to assure that neck section 12c of the tube is centered with respect to the electrical components 35-38 in order to attain the proper flux distribution of the various fields, such as those for deflection, convergence, etc. This necessary objective, as well as facilitating insertion of terminal prongs 12d of the tube into their respective recesses of socket 40, is accomplished by still another component of the subassembly including convergence system 36. This is referred to as auxiliary locater 39 that is supported by machine screws from purity coil 38. It is shown in FIG. 7 where it is seen to comprise a body or housing 39a which accommodates four gauge or centering pins 39b. The pins have a 90° displacement relative to one another and project a controlled amount into a central opening 39g of the locater through which the neck section of the tube threads. Preferably, in their rest position pins 39 having a radial displacement from the horizontal reference axis of the cart that is slightly less than the radial dimension of neck section 12c of the tube under test. However, the projecting ends of pins 39 are chamfored so that the tube may be threaded between the pins. These locating pins have a yielding amount; they extend from a cylindrical member 39c which is slidably supported within an assigned aperture in housing 39a and has a central recess to accommodate a compression or bias spring 39d. A retaining or cover plate 39e threadedly secured to member 39a locks the pins in their respective recesses and a setscrew 39f which threads through retaining plate 39e may be adjusted to control the pressure or bias which urges the pins into the gauging or centering position shown in FIG. 7. As the neck of the tube threads through electrical components 35-38 and enters into openings 39g, it is centered by the four pins 39b which yieldably engage the outer wall of the tube neck as it threads on through locating device 39. As workholder 20 arrives at its test position, neck section 12c of the tube passes beyond locater 39 and the terminal pins of tube base 12d are received by conductive sleeves 40a which constitute terminal prong receiving recesses of socket 40, as shown in FIG. 5.

To facilitate homing the terminal prongs of base 12d into socket 40, the socket is floatingly supported so that its recesses may readily align with the terminal prongs of the tube base. The socket has a body portion 40b of insulating material, such as acetal resin, shaped as a section of a sphere with planar end faces. It is provided with cover plates 40c and 40d at each of its end surfaces which may thread into or otherwise be affixed to the socket. Body member 40b is provided centrally with a cylindrical aperture 40e dimensioned to receive the center post 12e of tube base 12d and also having a cutout keyway (not shown) to accommodate the key normally carried by that post and extending beyond the free ends of the terminal prongs for orientation purposes. Additionally, the end surface of member 40 which is to be entered by the neck of the tube is suitably recessed to accept the tube while the opposite end is also cut away to accommodate the various conductors 41 which extend circuit connections through the conductive recesses of the socket to the terminal prongs received therein. This portion of member 40 may be closed by an insulating cap 40f which is retained in position by cover plate 40c.

Member 40b is floatingly supported within a bushing 42 of complementary configuration with member 40 extending beyond the bushing to have limited rotational displacement with the limits established by the space separation of covers 40c and 40d from the bushing surfaces. Limits on yawing are also imposed by a setscrew 42b which threads through bushing 42 into a recess 40g of body member 40. Bushing 42 is floatingly supported within an appropriately shaped recess in a support 44 as most clearly seen in FIGS. 5 and 6. The bushing is provided with flat sections 42c facing apertures in support 44 through which springs 42d extend and press against bushing 42. The pressure of these springs may be adjusted by setscrews 44b which thread through the openings in support 44. The bushing is retained in place by a ring 43 which is attached by machine screws 43a to support 44 which has linear ball bushings 44a through which support 44 is slidably mounted to a pair of posts 45 extending horizontally and rearwardly from support member 33. Springs 45a positioned between support 44 and adjustable stops 45b carried by posts 45 urge support 44 and socket 40 in the direction of locater 39. The surface of locater 39 facing socket 40 is a reference surface against which cover 40d comes to rest, establishing the socket in a predetermined orientation relative to locating device 39. Buffers 45c may be interposed between support 44 and support 33 having a thickness sufficient to permit the abutting relation of cover 40d with the facing surface of locater 39. A neophrene or other compliant insert 44d may line the bushings of member 40 to give added compliance in the X and Y planes to support 44 and limited rotational movement of bushing 42 is permitted by a radially extending slot 42a and a pin 43a which extends from retainer 43 into recess 42a.

Conductive connections to socket 40 extend from a terminal board 45 supported by way of insulators 45a from vertical standard 33 and having two rows of terminals 45b and 45c to which connections are made by conductors that are equipped with banana plugs. The top row 45b of terminals receive the family of conductors 41 that connect with the conductive female connectors included within socket 40. The lower row 45c of terminals receives conductors 49 that lead from electrical supply systems contained within lower compartment 10 of the cart and described hereafter. On the opposite face, terminal board 45 has a series of spark gaps one of which is represented at 45d. One such spark gap is provided for the terminals that connect with the cathodes, $G_1$, $G_2$, and $G_3$ of the tube under test. These serve to provide arc protection. They have one electrode connected to an assigned terminal of upper row 45b and a companion electrode that is returned to a ground. Aside from a separate high-voltage lead 47 terminated in a connector 47a for engaging a high-voltage contact provided in the funnel portion of the tube envelope, all of the electrical connections to the pins of the tube and through these pins to the electrode systems of the tube under test are made from terminal board 45.

A pair of spring-biased detents 18, indicated in FIG. 4, may seat in recesses provided on platform 21 of workholder 20 to releasably restrain the workholder in its loading and in its test positions. If desired, a manually operated release (not shown) may be provided to withdraw the detents when it is desired to displace the workholder or they may be overcome simply by forcing the workholder although a positive release of the detent is preferred.

A pair of degaussing coils 46 are provided at the sidewalls of cart compartment 11 as indicated in FIG. 4. They are rectangular in shape and are laterally displaced relative to the longitudinal axis of the tube under test. When energized, they create a degaussing field which penetrates to the center of the shadow mask of the tube to accomplish degaussing in the usual way.

Aside from the degaussing field, chamber 11 of the test cart is carefully shielded by lining five faces of the chamber with thin sheets of a nickel alloy, preferably conetic which is distributed by Perfection Mica Company of Bensenville, Illinois. The faces that are lined with this material are the two sidewalls, the top surface, the back surface and the bed 24 of compartment 11 and the sheets preferably overlap at the meeting planes of these faces in order to preserve the integrity of the field. Single laminations are sufficient on all of the shielded surfaces although it is preferred to employ a double layer of shield material over bed 24 of the chamber.

ELECTRICAL SYSTEM

The lower compartment 10 of the cart houses various energy sources for supplying dynamic signals and DC operating potentials of adjustable intensity to the energizing means, described above, contained in compartment 11 for establishing the necessary operating conditions to test the tube and determine its characteristics. Preferably, the sources contained within compartment 10 are of modular form so that any one may be removed for repair, replacement or the like. It is also distinctly preferred that the voltage sources be well regulated and, for the most part, these various sources are otherwise of conventional construction so that it is not necessary to disclose their circuitry. It is sufficient to identify the electrical systems requirements and such identification will make clear that the components of the system are indeed well known. From the standpoint of packaging, it is convenient to mount most of the modules from the front and rear panels of cart compartment 10 while arranging that the side panels of the compartment are removable for inspection, servicing or replacement of any of the modules.

Figure 9:
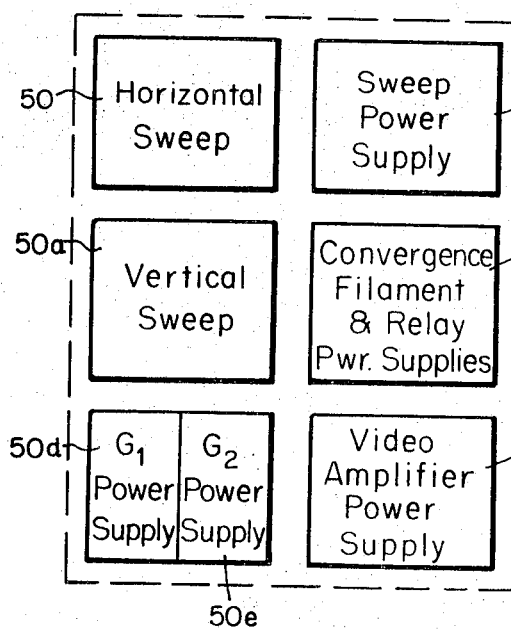
Figure 10:
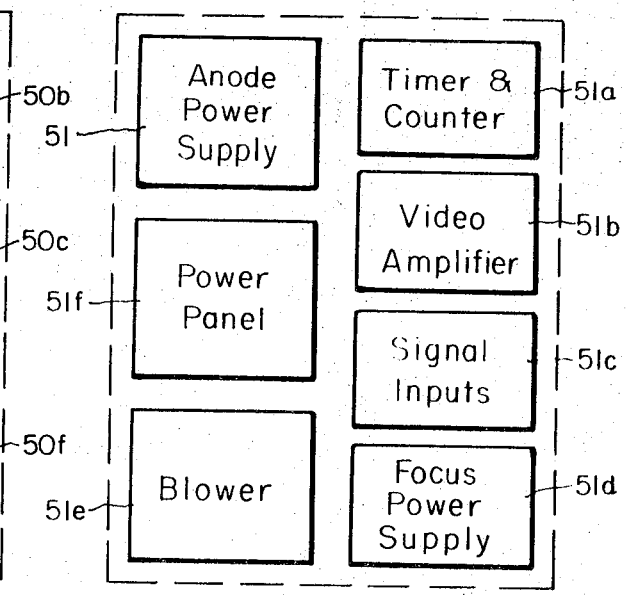

A package arrangement that has been found quite acceptable is indicated in FIGS. 9 and 10 which identify modules annexed to and supported by the front and rear panels of compartment 10, respectively. These include a horizontal sweep system 50, a vertical sweep system 50a, a sweep power supply 50b, a power supply 50c for the DC convergence system, filaments and relays of the electrical system, a $G_1$ power supply 50d, a $G_2$ power supply 50e and a video amplifier power supply 50f. The components supported from the back panel include an anode or high-voltage power supply 51, a timer and counter 51a, a video amplifier 51b, a signal input stage 51c, a focus power supply 51d, a blower 51e and a power panel 51f. The timer and counter 51a is merely a mechanism that records the number of hours of operation of the test cart and a counter that counts the number of tubes that have been tested in the cart. The signals available through input 51c include monoscope, crosshatch, horizontal drive, vertical drive and blanking signals developed in an external source and delivered to input 51c. The input signals connect with attenuators through which the signals are balanced and switching is provided so that the signals may be utilized in the cart as required in the testing procedures. Power panel 51f includes capacitors in order to balance the power factor, the capacitors employed in the degaussing signal generating system, power release and interlocks, the AC input for the electrical installations of the cart as well as an on/off circuit breaker.

INTERCONNECTION AND FUNCTION SELECTING SYSTEM

Figure 11:
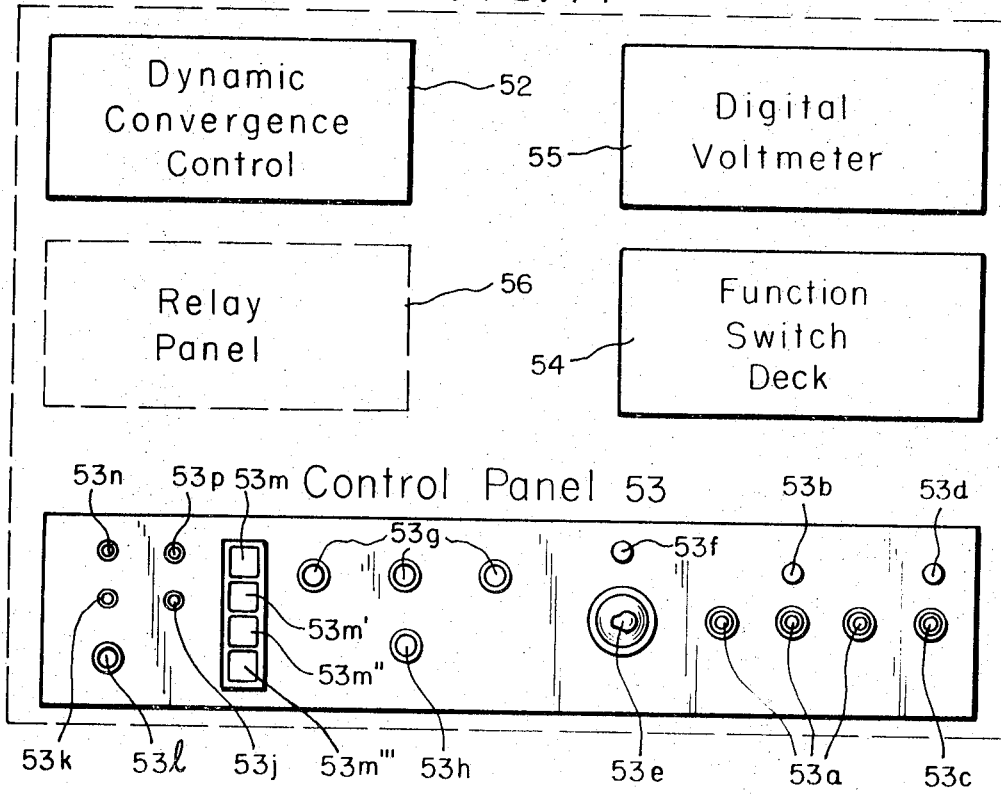

An interconnection system of the cart constitutes means for connecting the various energy sources represented in FIGS. 9 and 10 to the aforedescribed energizing means contained in cart compartment 11 and also for selectively establishing a predetermined one of a series of test circuits. Each of these test circuits includes a voltmeter and a selected one of the test points available through the energizing means of cabinet compartment 11. More particularly, the interconnection system is a relay and switching arrangement by means of which test circuits, utilizing signals and/or potentials from the electrical systems of cart compartment 10 and including connections to a common voltmeter, operatively are connected with selected points or electrode terminals of the tube under test in order that any of its operating characteristics may be measured and evaluated. For a system of this type to be effective it is, of course, necessary to have operator controls that facilitate sequencing the many individual tests to be conducted and that is accomplished with control deck 13 which additionally has the setup controls for establishing proper operating conditions of the tube under test. The components of the control deck are identified in FIG. 11 and, as there represented, include a dynamic convergence control panel 52, a further control panel 53, a function switch deck 54, and a digital voltmeter 55. FIG. 11 also shows, in broken-construction line, a relay panel 56 shown in broken construction since it is physically located in cart compartment 10 packaged between the various energy sources identified in FIGS. 9 and 10.

Dynamic convergence control panel 52 essentially comprises a series of potentiometers which adjust the amplitude of the horizontal and vertical convergence control signals that are developed by suitable wave shaping of signals derived from the horizontal and vertical sweep systems in known fashion. These sweep signals, controlled as to amplitude, are delivered to the various windings of the three electromagnet components of convergence arrangement 36 to accomplish dynamic convergence. All of these matters, as to circuitry, adjustment and function are well known in the art.

The controls mounted in panel 53 are as follows:

53a—static convergence controls
53b—convergence field direction control and on/off switch
53c—blue lateral control
53d—blue lateral direction control and on/off switch
53e—purity control
53f—purity field direction control and on/off switch
53g—$G_2$ controls
53h—common $G_1$ control
53j—degaussing control
53k—high-voltage initiate switch
53l—focus control
53m—four individual video control switches for monoscope, crosshatch, blank raster and line raster conditions.
53n—anode potential high-low switch
53p—focus voltage high-low switch These controls are manipulated by the operator principally to establish the proper conditions preparatory to conducting the tests available to the operator by the function switch deck 54.

Figure 12:
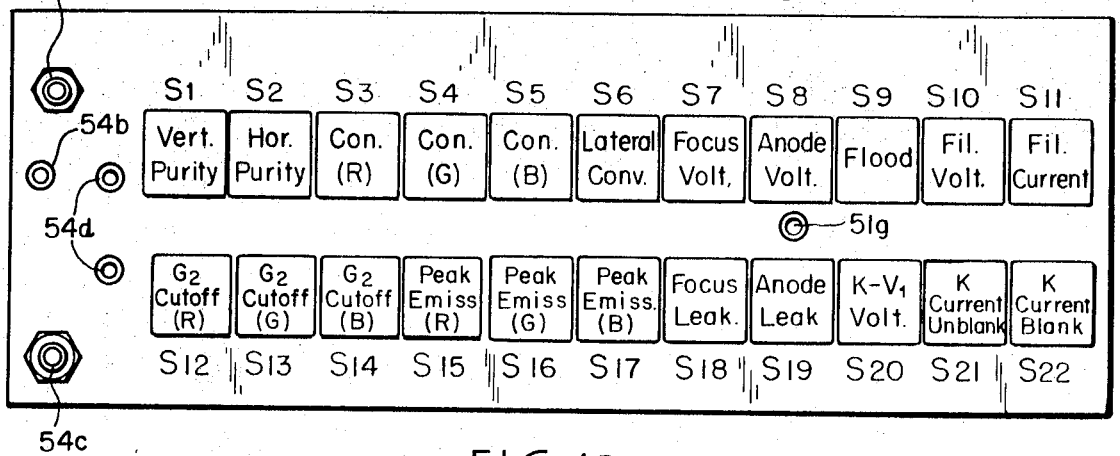

The function switch deck 54 is the operator's manual through which selections can be made of the series of test circuits that are available and with each such selection the voltmeter 55 is connected in circuit with the particular test circuit chosen. FIG. 12 shows the switch deck to have 22 switches for the following test circuits, reading from left to right of the top switch bank and then in the same direction for the lower switch bank:

$S_1$—vertical purity
$S_2$—horizontal purity
$S_3$—radial convergence (red)
$S_4$—radial convergence (green)
$S_5$—radial convergence (blue)
$S_6$—blue lateral convergence
$S_7$—focus voltage
$S_8$—anode voltage
$S_9$—flood voltage
$S_{10}$—filament voltage
$S_{11}$—filament current
$S_{12}$—$G_2$ cutoff (red)
$S_{13}$—$G_2$ cutoff (green)
$S_{14}$—$G_2$ cutoff (blue)
$S_{15}$—peak emission (red)
$S_{16}$—peak emission (green)
$S_{17}$—peak emission (blue)
$S_{18}$—focus leakage
$S_{19}$—anode leakage
$S_{20}$—cathode to $G_1$ voltage
$S_{21}$—cathode current (unblanked)
$S_{22}$—cathode current (blanked)

In addition to such switches deck 54 has a jack 54a into which may be connected a microscope equipped with a lamp to be energized through the jack. Control 54b is the $G_1$ setup or calibration potentiometer and 54c is a control of the light intensity of the microscope that may be energized through jack 54a. An indicator lamp 51g located just above anode leakage switch $S_{19}$ is energized during the anode leakage test as described hereafter.

Figure 13:
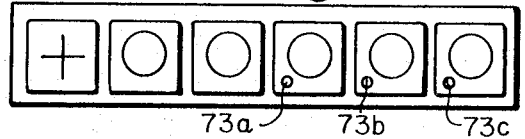

The digital voltmeter 55 has an indicator arrangement of the type shown in FIG. 13. There are six windows at which indicia may be presented. In the first one on the left there may be +/− and each of the others may display any digit from zero through nine, inclusive. The final three have lamps 73a, 73b, and 73c which may be selectively energized to designate a decimal point. The voltmeter is a high impedance instrument and all of the test circuits are normalized by suitable resistance arrangements to the scale of the voltmeter.

It is known that certain of the tests desired to be conducted on the picture tube undergoing final test are incompatible with one another and it should not be permissible to initiate one particular test circuit whenever an incompatible test circuit has, in fact, been established. Therefore, the interconnection system with its switches and relays comprises means responsive to the selection of a particular test circuit for disabling those of the remaining test circuits that may be incompatible with the particular one that has been selected. Expressed differently, the interconnection system provides a priority sequence for certain of the test circuits which means that when any test circuit of a given priority is established, those of lesser priority are disabled. It is not necessary, nor is it desirable to encumber this description with the total circuit diagram of all of the switching and relay circuitry of the test cart; consideration of one or two illustrative circuits will suffice to demonstrate the priority sequence.

FOCUS SUPPLY PROGRAM

Figure 14:
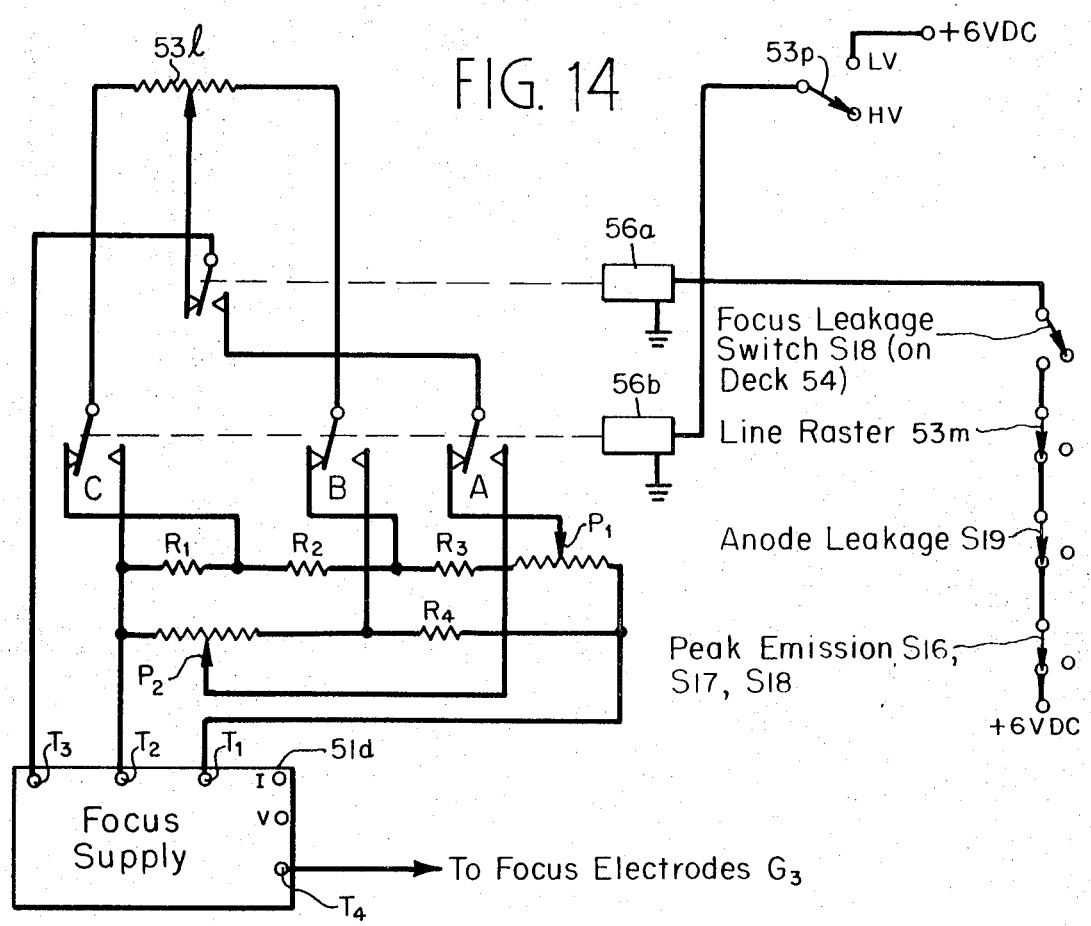

FIG. 14, by way of illustration, relates to the focus supply and the test circuits associated with focusing. The regulated focus supply 51d of the cart is shown in block form since it is conventional as to structure and operation. The supply has three terminals $T_1$, $T_2$ and $T_3$ which connect to an adjustable resistive network which determines the value of focus voltage delivered to an output terminal $T_4$ for application to the focus or $G_3$ electrodes of the tube under test. Terminal $T_1$ may be at +80 volts and terminal $T_2$ may be at −20 volts, presenting a potential difference between them of 100 volts. The connection to terminal $T_3$ provides a control voltage for controlling a voltage amplifier within source 51d to determine to voltage at output terminal $T_4$. The resistive network comprises a series of resistors $R_1$–$R_4$, inclusive, and three potentiometers 531 which is operable from control deck 13 and potentiometers $P_1$ and $P_2$ that are available at the front panel of the focus power supply module. A pair of relays 56a and 56b have contacts arranged in the manner shown to permit resistive programming of the focus supply as required to meet the rated operating potentials for the tube and the conditions of test. Either high or low voltage mode is available as controlled by switch 53p of control deck 13. With the circuit in the condition shown, both relays 56a and 56b are deenergized and the focus power supply is in its high-voltage mode. The voltage output is determined by resistors $R_1$–$R_3$ and potentiometers $P_1$ and 531. Adjustment of the latter determines the magnitude of voltage applied to terminal $T_3$ and thereby permits the voltage available at terminal $T_4$ for application to the focus electrodes $G_3$ to be set at control panel 13 to a desired value. In order to conduct the focus leakage test, the focus leakage function switch $S_{18}$ of deck 54 is depressed, energizing relay 56a and displacing its movable contact to the right into engagement with a stationary contact that instantaneously connects to the tap of potentiometer $P_1$. This increases the voltage applied to terminal $T_3$ as well as the focus voltage a desired amount appropriate for focus leakage testing. Concurrently, voltmeter 55 is connected to terminal I of focus supply 51d through other contacts (not shown) of the focus leakage switch to measure focus leakage current. The current may be adjusted by adjustment of potentiometer $P_1$.

With the focus leakage switch $S_{18}$ in its open position, namely that indicated in FIG. 14, the focus voltage switch $S_7$ of function deck 54 may be depressed, connecting the voltmeter to the terminal V of focus supply 51d to record the terminal voltage of the supply and the focus voltage delivered to the focus electrode $G_3$. Again, as stated above, the focus voltage may be set to a desired focus value by potentiometer 531 of control deck 53.

The alternate or low-voltage focus mode may be established by actuating switch 53p of control deck 13 which energizes relays 56b and displaces its three contacts from the stationary contacts with which they are shown in engagement in FIG. 14 to the alternate contacts. For this condition, the terminal voltage of supply 51d is determined by resistor $R_4$ and potentiometer $P_2$ as well as focus control potentiometer 531. The focus leakage for the low-voltage condition may be measured by now actuating the focus leakage switch $S_{18}$ of function deck 54 to energize relay 56a and connect terminal $T_3$ to the tap of potentiometer $P_2$, suitably to increase the focus voltage. At the same time, meter 55 is connected to terminal I of supply 51d to measure the leakage current which may be adjusted by potentiometer $P_2$. Also, actuation of the focus voltage switch 57 of function deck 54 instead of the focus leakage switch $S_{18}$ will read the focus voltage available in this low-voltage mode.

The priority sequence of the interconnect system is also indicated, in part, in FIG. 14 by the series arrangement of the following switches which are shown in their unactuated positions:

peak emission—switches $S_{15}$, $S_{16}$ and $S_{17}$
anode leakage—switch $S_{19}$
line raster—one switch of 53m
focus leakage—switch $S_{18}$ If any of the first three named switches is actuated, displacing it from the contact upon which it rests in FIG. 14 to the other one of its contact pair, the 6-volt DC supply to focus leakage switch $S_{18}$ will be interrupted. This means that focus leakage testing cannot be accomplished when any of the line raster, anode leakage, or peak emission functions is being tested.

ANODE SUPPLY PROGRAM

By way of further illustration, FIG. 15 is a schematic representation of the anode supply program circuit which controls anode supply 51 to establish any of three distinct functions for either of two modes, these being the high- and low-voltage modes similar to the two modes of the focus supply arrangement previously described. The functions for selection are (a) normal anode operating potential, (b) anode leakage potential, and (c) flooding anode potential utilized to expand the sweep of the tube under test.

Anode supply 51 is a regulated supply, differing from the usual supply systems of test equipment in that it exhibits a ramp characteristic, that is to say, the anode voltage delivered to output terminal $T_7$ builds rather slowly when the system is energized by operation of initiate switch 53k of control panel 13 to achieve a normal regulated voltage level after the passage of a few seconds rather than with a sharp transient. The reason for this, of course, is further to simulate the operating conditions of the tube in its normal environment in a television receiver. The anode voltage of such a receiver is derived from the sweep system and it builds slowly due to the electrical inertia of the system. The ramp characteristic of supply 51, obtained in known fashion by constructing the supply to have a relatively long charging time constant, is more appropriate than using a supply of the same nominal voltage but with a sharp rise time which could produce arcing in the tube under abnormal conditions and amounting to an invalid test of the tube.

Across terminals $T_5$ and $T_6$ of the anode supply, there is a resistive network of three branches, each in turn having two alternatively effective paths. The branch that establishes normal anode operating potential includes resistor $R_6$ and variable resistor $R_9$ which are effective in the high-voltage mode, and resistor $R_5$ and variable resistor $R_8$ for the low-voltage mode. Anode leakage for the high-voltage mode is controlled by a variable resistor $R_{11}$ and for the low-voltage mode by a resistor $R_7$ in series with a variable resistor $R_{10}$. Finally, flooding anode potential for the high-voltage mode is determined by a variable resistor $R_{13}$ and for the low-voltage mode by a variable resistor $R_{12}$. Selection as between the high- and low-voltage modes is by means of a switch 53n on control deck 13 and a relay 56c which, as shown in FIG. 15, is deenergized for the high-voltage mode, positioning its movable contacts as indicated. Normal anode voltage for this mode is controlled by adjustment of resistor $R_9$ and its value may be measured by depressing the anode voltage switch $S_8$ of function deck 54, connecting voltmeter 55 to terminal V of supply 51.

When the anode leakage test is to be conducted, the anode leakage switch $S_{19}$ of function deck 54 is actuated energizing relay 56d. This is a time delay relay in the sense that, once energized, it remains energized for a predetermined time interval. Its energization is indicated by a lamp 51g. During such operating conditions, the value of anode voltage is increased an appropriate amount determined by resistor $R_{11}$; voltmeter 55 is connected to terminal I of supply 51 and the leakage is recorded thereon.

The condition of flooding anode voltage is established by operating the flood switch $S_9$ of function deck 54 which opens the otherwise normally closed flooding switch to place resistor 12 or 13 in series with resistors $R_5$, $R_8$ or $R_6$, $R_9$ depending upon whether the circuit is instantaneously in the low- or high-voltage mode, respectively. The adding of resistance across terminals $T_5$, $T_6$ of supply 51 by opening contacts of switch $S_9$ decreases the normal anode potential a predetermined amount and, having reduced the level of anode voltage, the sweep is automatically expanded. At the actuation of flood switch $S_9$, voltmeter 55 is connected with terminal V of supply 51 to register the value of flooding voltage.

FIG. 15 further illustrates the priority sequence of the testing circuits. It will be observed that the normally closed contact of relay 56d extends 6 volts DC to the video output relay and the relays controlling peak emission as indicated by the legend on the drawing. During operating intervals in which relay 56d is energized, this supply is interrupted at the relay contacts, indicating priority of anode leakage testing over video output and peak emission testing.

INPUT SIGNAL SWITCHING

The priority sequence is not exclusively under control of function deck 54; in some instances, it is under the control of control panel 53. An illustration is given in FIG. 16, showing the input signal switching arrangement. The cables designated "mono," "X-hatch" and "blank" lead from external signal sources which plug into the cart through jacks 60a, 60b and 60c. The resistive attentuators 61a, 61b and 61c are provided so that the three signal inputs are balanced to the end that the light level with the tube under test remains essentially the same for all settings of the video or signal control switches. Operation of these four switches controls the energization of relays 56e, 56f and 56g as required to deliver the selected and appropriate input signal to video amplifier 51b. Here, as with FIG. 15, the circuit under consideration includes no capacitors; the two parallel, closely spaced lines represent contacts that may be closed as a switch is actuated. The showing of a pair of such parallel lines with a diagonal line through them indicates a normally closed contact pair that may be open by actuation of one of the control switches.

When the monoscope switch 53m is actuated, contacts 62a and 62b close and relays 56e and 56f are energized, coupling the monoscope input to the input of video amplifier 51b. With the crosshatch switch 53m' actuated contacts 62a are open and contacts 62b are closed. Relay 56e is deenergized which interrupts the connection from the monoscope input and completes a connection from the X-hatch input through the switch pair closed by energized relay 56f to video amplifier 51b.

With the line raster switch 53m" closed, contacts 62a and 62b are both open and relays 56e and 56f are deenergized. In this condition of the circuit, the blanking signal input is applied to video amplifier 51b but a video output relay (not shown) is deenergized so that the blanking signal does not reach the tube under test. At the same time, contacts 62c close to energize relay 56g which interrupts the B supply of the vertical sweep system 50a. As a consequence, the display of the tube is simply a horizontal line.

With the blanked raster switch 53m'' operated, the video output relay which had previously been deenergized is now energized and a blanking signal is applied through video amplifier 51b to the tube under test.

The circuit point E designates the 6-volt DC supply to the relays controlling peak emission, focus leakage and the video output relays. This supply is normally continued through the normally closed contact 62d which opens when the line raster switch 53m'' is actuated. Accordingly, the line raster function has priority over peak emission, focus leakage and the video output relays.

FUNCTION SWITCHES

In describing illustrative circuits, as for example those of FIGS. 14 and 15, mention has been made of various circuit connections completed through contacts opened or closed by manipulation of a switch of function deck 54. The circuit representations of FIGS. 17 and 18 clarify the structure of the switches and the functions they accomplish.

Figure 17:
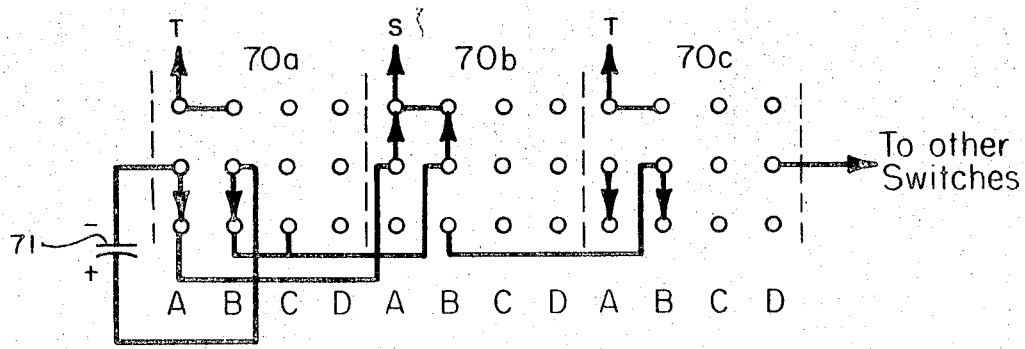

Since FIG. 12 indicates 22 function switches in function deck 54, there are 22 identical switching structures each of which has four separate sets of double pole, double throw circuit contacts. Three such switches 70a, 70b and 70c are indicated in FIG. 17. The four sections of each such switch are designated by the letters A, B, C and D. Section A of any switch connects voltmeter 55 to the proper sense or test point to measure voltage or current. Section B, for all switches other than $S_9$ Flood Anode potential, completes a circuit, to be described hereafter, for cleaning the switch contacts that are of consequence in the measurement to be made. Section C is variously connected according to the function assigned to the switch of which it is a part. For switches $S_1$ through $S_6$, $S_{11}$ and $S_{18}$, of FIG. 12, this section energizes a polarity switching relay associated with the input of voltmeter 55 and designated 56h in FIG. 18. This is a necessary step for meter 55 to be able to make certain measurements. For example, focus leakage current is measured in the ground return when switch $S_{18}$ is closed and, therefore, this switch also actuates the polarity reverse relay 56h. For switches $S_7$ through $S_9$ section C shorts the current resistor so that voltage, as distinguished from current, measurements may be made. For switches $S_{15}$ through $S_{17}$ Section C energizes peak emission relays establishing a $G_1$ to cathode potential appropriate for peak emission testing. For switches $S_{18}$ and $S_{19}$, section C energizes the focus leakage and anode leakage relays, respectively. For switch 21, section C locks the video output relay to permit measurement of cathode current in an unblanked condition.

Section D of the function switches shorts the input of voltmeter 55 when no functions have been set up and further activates the proper decimal point for the voltage or current reading that is to be taken in connection with any test.

Figure 18:
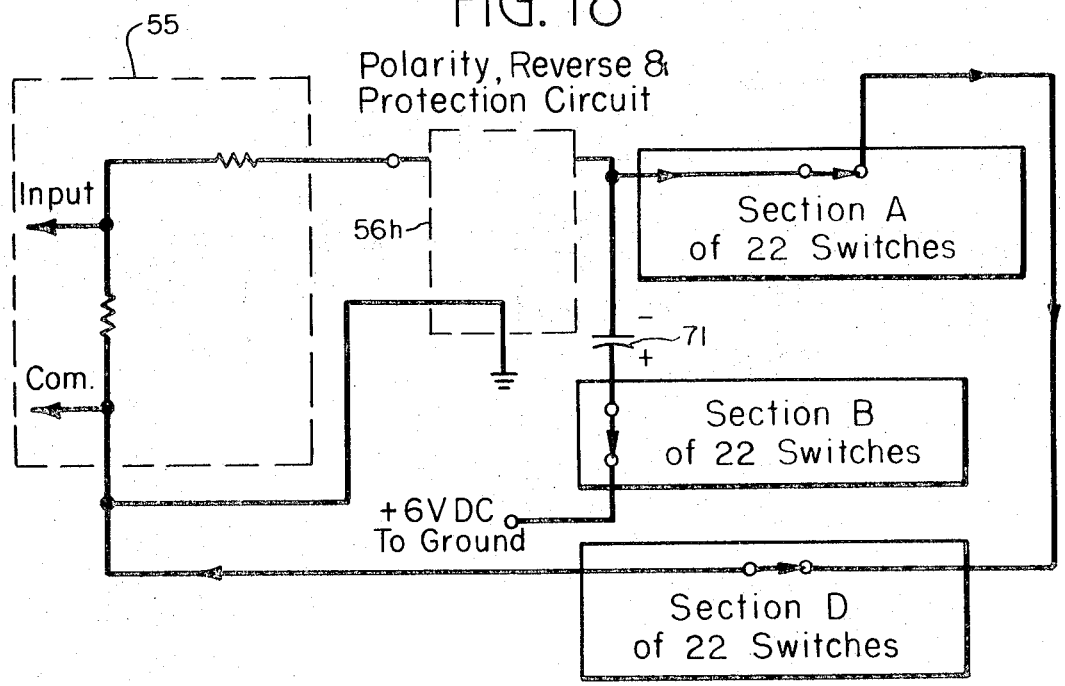
Figure 19:
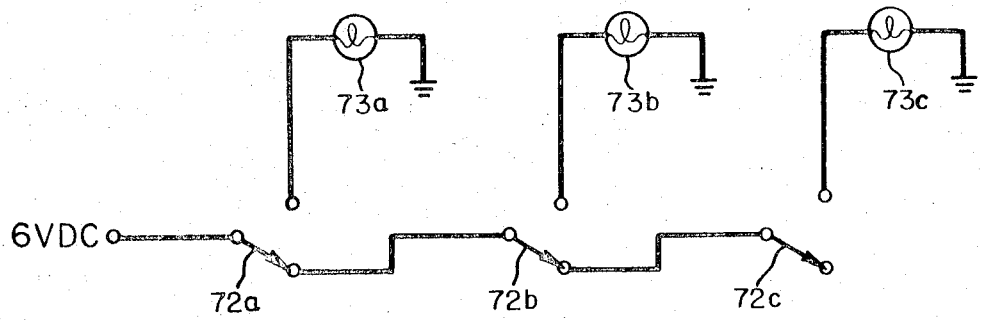

FIG. 18, in conjunction with FIG. 17, reveals an arrangement for passing a surge of current through operated switch contacts to clean those contacts as an incident to the selection of a test circuit including the particular contacts. More specifically, there is in this test arrangement a capacitor 71 for which a charging circuit of FIG. 18 may be established as follows: from the negative polarity electrode of the capacitor through Section A of all 22 switches of function switch deck 54, through the D section of those switches to ground, through the 6-volt DC power supply and the B section of the function switches to the positive polarity electrode. Through this circuit, which prevails when the cart is in its normal condition and no test functions are being carried out, capacitor 71 is charged.

When a function switch of deck 54 has been actuated, a discharge path, similar to that indicated in FIG. 17, is completed. This figure depicts actuation of switch 70b and its comparison with unactivated switches 70a and 70c makes clear the normal connections prevailing in the switch sections and those which result from actuation. When switch 70b has been operated, the discharge path for capacitor 71 may be traced from the negative polarity electrode through Section A of unactuated switch 70a, to the common terminal and the function selection terminal of section A of switch 70b, through contacts of section B of switch 70b, through contacts B of switch 70a, to the positive polarity electrode of capacitor 71. The discharge path has no lumped resistors and is highly conductive. When completed, it causes a surge of current to pass through the actuated contacts of section A in switch 70b to clean these contacts and avoid unwanted impedances otherwise attributable to a film that may be formed on the switch contacts. It is apparent from examination of FIG. 17 that a single discharge path is provided when one function switch is operated and the switches are interlocked so that only one may be actuated at a time, maintaining the circumstance that only one discharge path may be completed for capacitor 71 on the occasion of selecting any one switch of function deck 54. This interlock feature is the same as the priority sequence described in connection with the illustrative circuits of FIG. 14 and 15.

In like fashion, energizing circuits for lamps 73a, 73b and 73c of FIG. 13, serving as decimal point indications, are selectively made through sections D of those switches controlling functions for which a decimal designation is pertinent. A priority arrangement, much the same as that described in connection with FIG. 14, is relied upon so that if the decimal point to the extreme left of FIG. 13 is illuminated, the others cannot be excited. They may only be energized in the proper sequence. For example, FIG. 19 indicates a 6-volt DC supply that extends through three switches 72a, 72b and 72c. If switch 72a is actuated to rest against the terminal connecting the 6-volt supply to lamp 73a, obviously, the supply otherwise available to lamps 73b and 73c through switches 72b and 72e is interrupted. The lamps 73a, 73b and 73c, when individually energized, serve as the decimal indication of digital voltmeter 75.

The major functions performed by sections C & D each of the 22 function switches are as follows:

Switches $S_1$–$S_6$—Purity and Convergence Functions, Section (C) operates polarity reversing relay 56h; Section (D) displays decimal point No. 3.

Switch $S_7$—Focus Voltage Function. Section (C) shorts out the current sense resistor; Section (D) interlocks the decimal point display; decimal point No. 1 is used on this function and the readout is in kilovolts.

Switch $S_8$—Anode Voltage Function. Section (C) shorts out the current sense resistor; Section (D) displays decimal point No. 2, e.g. lamp 73b.

Switch $S_9$—Raster Flooding. Sections (C and D) same as for $S_8$; Section (B) causes the anode voltage to decrease with a resulting increase in raster size.

Switch $S_{10}$—Filament Voltage. Section (C) switches the common side of meter 55 to the filament supply; Section (D) displays decimal point No. 1, e.g. lamp 73a.

Switch $S_{11}$—Filament Current. Section (C) energizes polarity switching relay 56h; Section (D) displays decimal point No. 2, e.g. 73b.

Switches $S_{12}$, $S_{13}$, $S_{14}$—$G_2$ voltage functions. Section (C) not used; Section (D) displays decimal point No. 3, e.g. lamp 73c.

Switches $S_{15}$, $S_{16}$, $S_{17}$—Peak Emission Functions. Section (C) of each switch energizes one of the peak emission relays, shorting the respective $G_1$ element to the common cathode line; simultaneously the video output relay is deenergized; Section (D) displays decimal point No. 1, e.g. lamp 73a.

Switch $S_{18}$—Focus Leakage Function. Section (C) energizes the focus resistance program and polarity switching relay 56h; the focus power supply potential is raised to a predetermined value; the video output relay is deenergized; Section (D) interlocks the decimal point system but no decimal point is displayed.

Switch $S_{18}$—Anode Leakage Function. Section (C) energizes the anode resistance program interval timing relay raising the anode potential to a predetermined level; the video output relay is deenergized; section (D) energizes polarity switching relay 56h.

Switch $S_{20}$–$G_1$ Voltage Function. Section (C) not used; Section (D) displays decimal point No. 3, e.g. lamp 73c.

Switch $S_{21}$—Cathode Current Unblanked. Section (C) deenergizes the video output relay to remove the blanking signal; Section (D) displays decimal point No. 1, e.g. lamp 73a.

Switch $S_{22}$—Cathode Current Blanked. Section (C) not used; Section (D) displays decimal point No. 1, e.g. lamp 73a.

TEST PROCEDURE

One test procedure or program that may be carried out with the described arrangement is as follows:

Set main circuit breaker to "ON" position.

Swing out tube workholder 20 and load the tube to be tested.

Make anode voltage connection 47a to the loaded tube.

Set line regulator to "ON" position.

Set low/high voltage switches 53n, 53p for proper mode.

Turn initiate switch 53k "ON."

Push in and turn all $G_2$ controls 53g to maximum counterclockwise position.

Push in and turn $G_1$ control 53h counterclockwise.

Push in focus leakage switch $S_{18}$ and read meter 55.

Push in anode leakage switch $S_{19}$, read meter 55 and check stray emission.

Adjust for red, green, and blue cutoff by pushing line raster switch 53m'' and pulling out and adjusting the respective $G_2$ controls 53g.

Push in green and blue $G_2$ controls 53g.

Push in blanked raster switch 53m'''.

Push degauss button 53j for 1 second.

Adjust yoke for red dead center purity.

Center red ball with purity joystick 53e.

Push in crosshatch video switch 53m'.

With red and green $G_2$ controls 53g pulled out, converge red and green crosshatch with red and green convergence controls.

Pull out blue $G_2$ control and converge blue crosshatch using blue lateral and blue DC convergence controls of control panel 52.

Adjust yoke for red field with green and blue $G_2$ controls 53g pushed in.

Push in crosshatch video switch 53m'.

Focus each crosshatch field separately and read focus volts for spread and high and low readings on meter 55.

Push in blue $G_2$ control 53g and reconverge red, green and blue crosshatches.

Read meter 55 with vertical and then horizontal purity switches $S_1$ and $S_2$ closed.

Read meter 55 with red, green, and blue radial convergence switches $S_3$, $S_4$ and $S_5$ closed.

Read meter 55 with blue lateral convergence switch $S_6$ closed.

Check each field for purity and screen defects.

Push in cathode current unblanked switch $S_{21}$ and adjust $G_1$ control 53h for appropriate value and inspect white field uniformity.

With all three $G_2$ controls 53g pulled out, adjust $G_1$ control 53h for proper current to check for arcing.

Adjust for red, green, and blue cutoff.

Push in all $G_2$ controls 53g.

Read red, green, and blue emission on meter 55 by operating switches $S_{15}$, $S_{16}$ and $S_{17}$.

Read red, green, and blue $G_2$ voltages on meter 55 by operating switches $S_{12}$, $S_{13}$ and $S_{14}$.

Turn initiate switch 53k off.

Remove tube from workholder 20.

The described arrangement permits complete testing of color cathode-ray tubes with facility and dispatch. The digital voltmeter, recording the test results in numerics, greatly facilitates the determination of an acceptable or a reject tube simply by comparing the measured results with allowable tolerances expressed in readings of the digital voltmeter. Additionally, the loading features of the test cart are a distinct improvement and greatly reduce the possibility of damage to the deflection yoke, convergence system and the like as the tube is advanced to the test position. Finally, the burden on the operator has been minimized; the function switch deck is a convenient mechanism for conducting a desired series of tests quickly and with little effort on the part of the operator.

To change the test cart set in order to test rectangular tubes of different sizes it is only necessary to adjust mechanical linkages, for example post 27f which positions clamp 27 and the toggle 31b, 31c which controls the travel of workholder 20. If necessary, the limit stops controlling the travel of yoke 35 may also be adjusted. The screen supports 27, 28 may also be replaced for testing round tubes for which C-type rather than L-type supports are more appropriate.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A final test arrangement for a color cathode-ray tube having an electrode system enclosed within an envelope having a funnel-shaped portion terminated at its large end in a screen section and terminated at its small end in both a neck section and a base having terminal prongs for extending circuit connections to said electrode system, said arrangement comprising:

a workholder, movable between a loading position and a test position, having a screen support for receiving said screen section and for releasably holding said tube with its neck section disposed horizontally, a gauge coaxial with a reference horizontal axis for engaging said funnel-shaped section in a reference plane disposed transversely of the longitudinal axis of said tube to locate said tube longitudinally within said workholder, and a neck support normally positioned coaxially of said reference axis to receive said neck section and align said tube axis with said reference axis but movable to a second position in which said neck support is spaced away from said neck section;

a socket supported coaxially of said reference axis having recesses for receiving said terminal prongs as said workholder is moved into said test position;

a deflection yoke supported coaxially of said reference axis between said workholder and said socket and movable along said reference axis;

and means for displacing said neck support to its aforesaid second position to free said neck section for passage through said yoke.

2. A final test arrangement in accordance with claim 1 in which said screen support of said workholder comprises a horizontally disposed portion upon which said screen section rests and a vertically disposed portion for engaging said funnel-shaped portion of said envelope;

and at least one clamp for releasably holding said tube with its funnel-shaped portion firmly pressed against said vertical portion of said screen support.

3. A final test arrangement in accordance with claim 2 for testing a rectangular color tube and in which said screen support has two components, individually having said horizontally and vertically disposed sections, spaced on said workholder to receive the corners of said envelope, and further having a pair of said clamps associated with said two components, respectively.

4. A final test arrangement in accordance with claim 1 in which said gauge of said workholder is generally circular in configuration and has a diameter of such dimension as to locate said reference plane on said funnel-shaped portion of said tube.

5. A final test arrangement in accordance with claim 4 in which said gauge is an arc of a circle having an arc length less than 360° to present an opening for admitting said envelope into said gauge.

6. A final test arrangement in accordance with claim 1 in which said means for displacing said neck support comprises means responsive to movement of said workholder between said loading and said testing positions for displacing said neck support between its normal and second positions.

7. A final test arrangement in accordance with claim 6 in which said neck support is an open, generally V-shaped support, and said displacing means comprises a linkage system which rotates said neck support away from said reference axis to said second position which is sufficiently spaced from said reference axis to permit moving said deflection yoke along said axis and into juxtaposition with said gauge.

8. A final test arrangement in accordance with claim 7 in which said linkage system provides lost motion permitting said workholder to move a predetermined amount along said reference axis both in the direction of and away from said test position while said neck support is in its second position without moving said neck support towards its normal position.

9. A final test arrangement for a color cathode-ray tube having an electrode system enclosed within an envelope having a funnel-shaped portion terminated at its large end in a screen section and terminated at its small end in both a neck section and a base having terminal prongs for extending circuit connections to said electrode system, said arrangement comprising:

a workholder, movable between a loading position and a test position, having a screen support for receiving said screen section and for releasably holding said tube with its neck section disposed horizontally, and a gauge coaxial with a reference horizontal axis for engaging said funnel-shaped section in a reference plane disposed transversely of the longitudinal axis of said tube to locate said tube longitudinally within said workholder and align said tube axis with said reference axis;

a socket of generally spherical configuration having recesses for receiving said terminal prongs; a bushing of complementary configuration surrounding and floatingly supporting said socket in coaxial alignment with said reference axis; means for biasing said socket and said bushing in the direction of said workholder to cause said socket to be self-aligning and with said terminal prongs as said workholder is moved into said test position; and a deflection yoke supported coaxially of said reference axis between said workholder and said socket and movable along said reference axis.

10. A final test arrangement in accordance with claim 9 in which an auxiliary locating device is supported coaxially of said reference axis between said socket and said yoke to direct the base of the tube under test into said socket, said device having a plurality of guide pins arranged equiangularly from one another in a plane transverse to said reference axis, spaced from said axis by approximately the radial dimension of said neck section of said tube, and yieldably biased in the direction of said axis.

11. A final test arrangement in accordance with claim 10 in which the side of said locating device facing said socket constitutes a reference surface having a predetermined angular relation to said reference axis, and in which said socket is biased into abutting relation with said reference surface to establish said socket in a predetermined initial angular relation to said axis.

12. A final test arrangement in accordance with claim 11 in which said socket is a section of a sphere with at least one planar end face for abutting said reference surface, and including means for restricting movement of said socket to a predetermined range of values.

13. A final test arrangement in accordance with claim 12 in which said auxiliary device is affixed to a stationary portion of said test arrangement, in which support posts extend from said stationary portion in parallel relation to said reference axis, and in which said socket is supported by said posts through resilient bushings which add further compliance to the socket arrangement.

14. A final test arrangement in accordance with claim 11 in which an arrangement, including a convergence arrangement, a blue lateral magnet, and a purity coil, is mounted coaxially of said reference axis at a fixed distance from the normal position of said socket and through which the neck section of the tube under test is threaded in reaching said auxiliary locating device.

15. A final test arrangement in accordance with claim 14 in which said workholder further includes an open neck support normally positioned coaxially of said reference axis to receive said neck section but movable to a second position in which said neck support is spaced away from said neck section, and in which there are means for displacing said neck support between its normal and second positions as said workholder is moved between its loading and test positions.

16. A final test arrangement in accordance with claim 5 in which conductive contact springs are mounted with said gauge to contact the funnel-shaped portion of a tube contained in said workholder in order to ground the envelope of said tube.

* * * * *